United States Patent
Maruyama

(10) Patent No.: US 6,205,567 B1
(45) Date of Patent: *Mar. 20, 2001

(54) FAULT SIMULATION METHOD AND APPARATUS, AND STORAGE MEDIUM STORING FAULT SIMULATION PROGRAM

(75) Inventor: Daisuke Maruyama, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/030,858

(22) Filed: Feb. 26, 1998

(30) Foreign Application Priority Data

Jul. 24, 1997 (JP) .................................. 9-198608

(51) Int. Cl.[7] .................................. G01R 31/28
(52) U.S. Cl. .................. 714/741; 714/735; 714/738; 395/500.34
(58) Field of Search ................ 371/27.4, 27.1; 364/578, 264.3; 395/500, 183.06, 500.34; 257/499, 501, 506; 714/741, 724, 738, 739, 735, 731

(56) References Cited

U.S. PATENT DOCUMENTS

| | | | |
|---|---|---|---|
| 4,534,028 | * 8/1985 | Trischler | 714/731 |
| 4,862,399 | * 8/1989 | Freeman | 714/738 |
| 5,032,783 | * 7/1991 | Hwang et al. | 324/73.1 |
| 5,512,774 | * 4/1996 | Nakagawa et al. | 257/501 |
| 5,584,020 | * 12/1996 | Takasaki | 395/500 |
| 5,600,787 | * 2/1997 | Underwood et al. | 395/183.06 |
| 5,710,934 | * 1/1998 | Bona et al. | 714/724 |
| 5,896,401 | * 4/1999 | Abramovici et al. | 714/741 |

* cited by examiner

Primary Examiner—Albert De Cady
Assistant Examiner—Guy Lamarre
(74) Attorney, Agent, or Firm—Staas & Halsey LLP

(57) ABSTRACT

A fault simulation method in which a sufficient diagnostic rate is ensured by enabling a fault in a circuit area forward of a storage element to be handled as an object to be detected, to thereby increase the speed of detection of a fault; i.e., the speed of fault simulation. In the fault simulation method, the integrated circuit is divided into a backward circuit area, which is a combinational circuit area on the output-pin side of a storage element included in the integrated circuit, and a forward circuit area, which is a combinational circuit area on the input-pin side of the storage element. When a fault which propagates to input pins of the storage element exists in the forward circuit area, the value of the fault at that observation time is written into the storage element, and at a later observation time the value of the fault is read from the storage element and propagated to the backward circuit area from output pins of the storage element. The present invention is used when the serviceability of an integrated circuit, such as an LSI or an LSI-equipped printed board, is verified through use of test patterns.

20 Claims, 16 Drawing Sheets

FIG. 9(a)

| PATTERN NUMBERS OF ACCUMULATED TEST PATTERN SETS | | | | | | | | | | | | | | | | |
|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | --- |

FIG. 9(b)

| TEST PATTERN LENGTHS OF RESPECTIVE TEST PATTERN SETS | | | | | |
|---|---|---|---|---|---|
| 3 | 1 | 2 | 2 | 3 | 2 | --- |

FIG. 10(a)

| PATTERN NUMBERS OF TEST PATTERN SETS | | | | | | | | | | | | | | | |
|---|---|---|---|---|---|---|---|---|---|---|---|---|---|---|---|
| 1 | 2 | 3 | 12 | 13 | 14 | 6 | 7 | 8 | 9 | 10 | 11 | 15 | 16 | 4 | 5 |

FIG. 10(b)

| TEST PATTERN LENGTHS OF RESPECTIVE TEST PATTERN SETS | | | | | |
|---|---|---|---|---|---|
| 3 | 3 | 2 | 2 | 2 | 1 | 1 |

FIG. 11 n x m PATTERN NUMBER MATRIX

| 1 | 12 | 6 | UNSCHEDULED | UNSCHEDULED |
|---|----|----|---|---|
| 2 | 13 | 7 | UNSCHEDULED | UNSCHEDULED |
| 3 | 14 | 8 | UNSCHEDULED | UNSCHEDULED |
|   |    | 9 | | |

FIRST COLUMN    SECOND COLUMN    ← CHOICE OF PATTERN SET {8,9} IS REJECTED

FIG. 12 n x m PATTERN NUMBER MATRIX

| 1 | 12 | 6 | 8 | 10 |
|---|----|----|----|----|
| 2 | 13 | 7 | 9 | 11 |
| 3 | 14 | 4 | 5 | UNSCHEDULED |

FIG. 13

SCHEDULE FLAG

| SCHEDULED | SCHEDULED | SCHEDULED | SCHEDULED | SCHEDULED | UNSCHEDULED | SCHEDULED | SCHEDULED |
|---|---|---|---|---|---|---|---|
| 1 | 12 | 6 | 8 | 10 | 15 | 4 | 5 |
| 2 | 13 | 7 | 9 | 11 | 16 | | |
| 3 | 14 | | | | | | |

(CORRESPONDING PATTERN NUMBERS)

FIG. 14(a)

PATTERN NUMBERS OF TEST PATTERN SETS

| 15 | 16 | EMPTY | EMPTY | EMPTY | EMPTY | EMPTY | EMPTY | EMPTY | EMPTY | ---- |
|---|---|---|---|---|---|---|---|---|---|---|

FIG. 14(b)

TEST PATTERN LENGTHS OF RESPECTIVE TEST PATTERN SETS

| 2 | 0 | 0 | 0 | 0 | 0 | 0 | 0 | 0 | 0 | ---- |
|---|---|---|---|---|---|---|---|---|---|---|

FIG. 15(a)
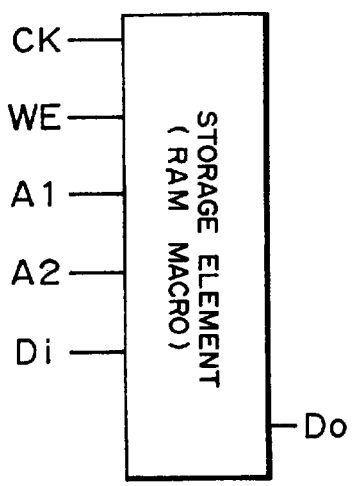
FIG. 15(b)
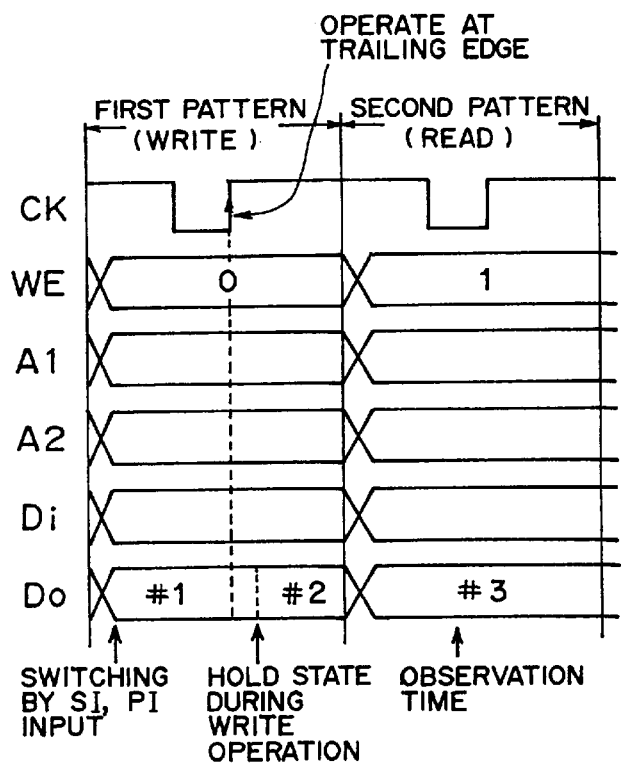
FIG. 16(a)  FIG. 16(b)

FIRST PATTERN

SECOND PATTERN

FIG. 18(a)
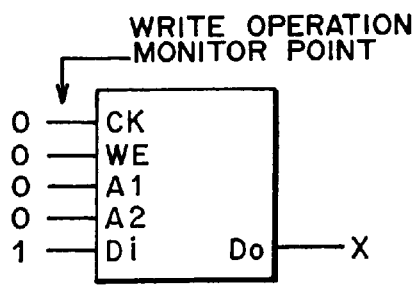
FIG. 18(b)
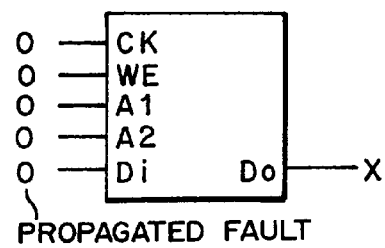
FIG. 18(c)
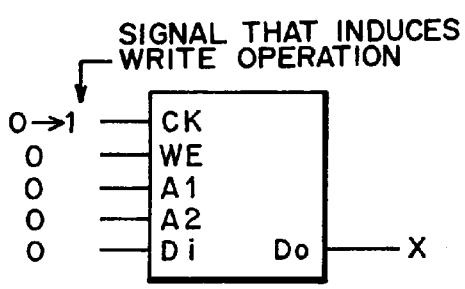
FIG. 18(d)
| ADDRESS | CONTENTS |
|---|---|
| 0 0 | 0 |
| 0 1 | X |
| 1 0 | X |
| 1 1 | X |
FAULT MEMORY SECTION
FIG. 18(e)
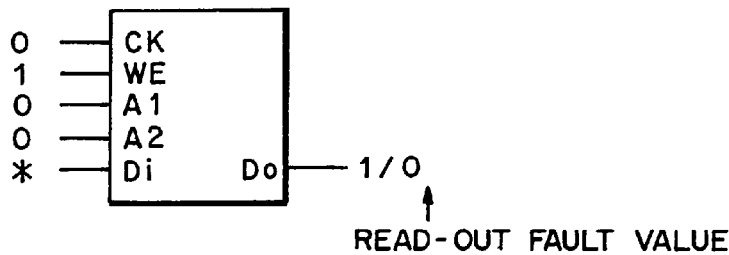

FAULT SIMULATION METHOD AND APPARATUS, AND STORAGE MEDIUM STORING FAULT SIMULATION PROGRAM

BACKGROUND OF THE INVENTION

1) Field of the Invention

The present invention relates to a fault simulation method and a fault simulation apparatus used for the purposes of verifying the serviceability of an integrated circuit, such as an LSI or an LSI-equipped printed board, through use of test patterns, as well as to a storage medium storing a fault simulation program.

2) Description of the Related Art

In recent years, there has been a demand for improvements in the reliability of test patterns, as integrated circuits have increased in scale and complexity.

The reliability (or effectiveness) of a test pattern is verified by means of fault simulation. As the number of test patterns has increased with an increase in the scale and complexity of a circuit, the time required for simulation has increased, as has the time required for generating test patterns. For this reason, it is desirable to increase the speed of the fault simulation used for verifying the test pattern.

Methods for increasing the speed of fault simulation are already in actual use; namely, (1) a method of processing a plurality of test patterns in parallel; and (2) a method of simultaneously detecting a plurality of faults.

Under method (1), true-value simulations for a plurality of test patterns are performed in parallel in order to make an integrated circuit stable. Subsequently, a single fault is injected or set into the integrated circuit, and fault detection is performed through use of a test pattern in order to check whether or not the fault of the integrated circuit can be detected by the respective test patterns. One example of method (1) is a PPSFP (Parallel Pattern Single Fault Propagation) method.

Method (2) complements method (1). More specifically, according to method (1), after true-value simulations for a plurality of test patterns have been performed simultaneously, fault simulation is performed on the basis of the assumption that there will be one fault. In contrast, according to method (2), for each test pattern the true-value simulation and the fault simulation are performed at one time by simultaneous propagation of a list of true values and a list of fault values (i.e., a fault list including a plurality of single-faults) through an integrated circuit.

The true value and the fault value propagate through the integrated circuit from the input to the output. Every time the true value and the fault value pass through a gate, the fault propagation at the gate is evaluated. A fault inactivated by passage through the gate (i.e., a fault which cannot pass through the gate) is eliminated from the fault list. In contrast, a fault—which is newly invoked as a result of passage of the gate—is added to the fault list.

For example, as shown in FIG. 20, assume that a fault list transmitted over a network N1 has a fault value $f_1$, and that this fault value $f_1$ passes through a gate G1 in response to the relationship between the fault value $f_1$ and true values from the network N1 and a network N5, so that a new fault is induced in a network N2 connected to an output of the gate G1. In this case, the fault values $f_1$ and $f_2$ are registered in a fault list of the network N2. Further, in a case where the fault value $f_1$ transmitted over the network N2 passes through a gate G2, where the fault value $f_2$ is inactivated by the gate G2, and where a fault value $f_3$ registered in a fault list of a network N3 passes through the gate G2, the fault values $f_1$ and $f_3$ are registered in a fault list of a network N4 connected to an output of the gate G2.

As a result of storage of such fault lists corresponding to all the networks on the integrated circuit, a plurality of faults that can be detected by a single test pattern is obtained in the form of a fault list. It is then checked whether or not the faults can be detected through use of the test pattern.

Method (2) includes, for example, a concurrent method.

In the case of method (1), only a combinational circuit is subjected to fault simulation. Further, the state of the circuit at the observation time of the past is handled as being irrelevant to the state of the circuit at the observation time of the present. Consequently, if a fault in a circuit area forward of a storage element propagates to the storage element, the fault is not propagated to a circuit area backward of the storage element. Accordingly, the fault is excluded from faults subjected to fault detection.

More specifically, even if the method (1) is applied to an integrated circuit which is not formed into a combinational circuit by means of full-scan design, a fault in the circuit forward of the storage element is not subjected to detection, which in turn makes it impossible to ensure a sufficient diagnostic rate.

The term "an integrated circuit formed into a combinational circuit by means of a full-scan design" refers to an integrated circuit which is designed so as to be able to handle a storage element (a sequential circuit) as a combinational circuit by connection of scan flip-flops (FF) to input/output terminals of the storage element (the sequential circuit) within the integrated circuit for the purpose of enabling scanning of input/output signals of the storage element. As a result of full-scan design, the sequential circuit is not observable from outside. Accordingly, an "integrated circuit not formed into a combinational circuit by means of a full-scan design" contains a sequential circuit which is observable from outside.

In contrast, according to method (2), a fault in the circuit area forward of the storage element is subjected to detection. However, fault lists prepared by grouping of the faults propagated through the networks within the integrated circuit must be stored so as to correspond to all the networks. An abundance of storage resources are required for storing the fault list.

For the gate evaluation that is executed during the course of propagation of the fault list (i.e., propagation of a fault), the fault list is managed in such a way that inactivated faults are eliminated from the list or newly-invoked faults are added to the list. Accordingly, managing the fault list requires a large quantity of processing.

The number of storage resources or the quantity of processing associated with the management of the fault list is increased as a fault-propagation route becomes longer or as the area in which the fault propagates becomes wider with an increase in the degree of integration of the integrated circuit.

That is, in method (2), since fault simulation is sequentially performed every one test pattern, and the number of storage resources and the quantity of processing increase as the scale of the circuit becomes larger, a massive amount of time is required to perform simulation.

SUMMARY OF THE INVENTION

The present invention has been developed in view of the foregoing problems in the art, and an object of the present invention is to provide a fault simulation method, a fault simulation apparatus, and a storage medium storing a fault simulation program, wherein a sufficient diagnostic rate is ensured by enabling the state of a circuit at the observation time of the past to be handled as relevant to the state of the circuit at the observation time of the present, while processing a plurality of test patterns in parallel, and enabling a fault in a circuit area forward of a storage element to be handled as an object to be detected, to thereby increase the speed of detection of a fault; i.e., the speed of fault simulation.

To accomplish the foregoing object, a fault simulation method according to the present invention is intended to detect a fault in an integrated circuit through use of a test pattern. The integrated circuit is divided into a circuit area backward of a storage element (hereinafter simply referred to as a "backward circuit area"), which is a combinational circuit area on the output-pin side of the storage element included in the integrated circuit, and a circuit area forward of the storage element (hereinafter simply referred to as a "forward circuit area"), which is a combinational circuit area on the input-pin side of the storage element. If a fault which propagates to input pins of the storage element exists in the forward circuit area, the value of the fault at that observation time is written into the storage element. At a later observation time the value of the fault is read from the storage element and propagated to the backward circuit area from output pins of the storage element.

A fault simulation apparatus according to the present invention is used to detect a fault in an integrated circuit through use of a test pattern. The fault simulation apparatus comprises a circuit isolation section for dividing the integrated circuit into a backward circuit area, which is a combinational circuit area on the output-pin side of the storage element included in the integrated circuit, and a forward circuit area, which is a combinational circuit area on the input-pin side of the storage element; a test pattern generation section for generating a test pattern set; a pattern accumulation section for accumulating a plurality of test pattern sets generated by the test pattern generation section; a pattern arrangement section for arranging the plurality of test pattern sets stored in the pattern accumulation section into a parallel test pattern; a parallel pattern true-value simulation section which performs true-value simulation in a true state—where there is not any fault—by inputting the parallel test pattern into the integrated circuit; a parallel pattern fault simulation section which performs fault simulation by inputting and propagating a fault into the integrated circuit after stabilization of the true-value simulation, and detects a fault on the basis of a difference between a result of the simulation and a result of the fault simulation; and a fault passage section. When a fault—which is propagated to the input pins of the storage element during the course of simulation by the parallel pattern fault simulation section— is in the forward circuit area, the fault passage section writes the value of the fault into the storage element at the observation time of the fault. At a later observation time, the fault passage section reads the value of the fault from the storage element and propagating it to the backward circuit area from the output pins of the storage element.

A storage medium according to the present invention stores a fault simulation program for automatically detecting a fault in an integrated circuit by means of a computer and through use of a test pattern. Through use of the fault simulation program, a computer is operated as circuit isolation means for dividing the integrated circuit into a backward circuit area, which is a combinational circuit area on the output-pin side of the storage element included in the integrated circuit, and a forward circuit area which is a combinational circuit area on the input-pin side of the storage element; test pattern generation means for generating a test pattern set; pattern arrangement means for arranging the plurality of test pattern sets generated by the test pattern generation means into a parallel test pattern; parallel pattern true-value simulation means which performs true-value simulation in a true state—where there is not any fault—by inputting the parallel test pattern into the integrated circuit; parallel pattern fault simulation means which performs fault simulation by inputting and propagating a fault into the integrated circuit after stabilization of the true-value simulation, and detects a fault on the basis of a difference between a result of the simulation and a result of the fault simulation; and fault passage means. When a fault—which is propagated to the input pins of the storage element during the course of simulation by the parallel pattern fault simulation means—is in the forward circuit area, the fault passage means writes the value of the fault at the observation time of the fault into the storage element. At later observation time, the fault passage means reads the value of the fault from the storage element and propagates it to the backward circuit area from the output pins of the storage element.

By virtue of the foregoing fault simulation method, fault simulation apparatus, and storage medium storing the fault simulation program according to the present invention, a plurality of test patterns are simultaneously processed, and fault simulation is performed on the basis of the assumption that there exists a relation between the state of the circuit at an observation time of the past and the state of the circuit at an observation time of the present. A fault in the forward circuit area propagated to the input pins of the storage element at the observation time of the past is temporarily written into the storage element. The fault is read from the storage element at the observation time of the present and is propagated to the backward circuit area from the output pins. Accordingly, the fault in the forward circuit area can also be handled as the object to be detected.

In the fault simulation method, a test pattern set for the purpose of detecting a fault in the integrated circuit is generated and accumulated. The thus-stored plurality of test pattern sets are sorted in descending order according to the length of each test pattern set. The thus-sorted plurality of test pattern sets are scheduled and are rearranged into a parallel test pattern while the sequentiality of each test pattern set is maintained. The parallel test pattern may be used as the foregoing test patterns.

Similarly, the pattern arrangement section of the fault simulation apparatus may be formed from a pattern sorting section which sorts the plurality of test pattern sets stored in the pattern accumulation section in descending order according to the length of each test pattern set, and a pattern scheduling section which schedules the plurality of test pattern sets sorted by the pattern sorting section, and rearranges the plurality of test pattern sets into a parallel test pattern while maintaining the sequentiality of each test pattern set.

Further, in the storage medium storing a fault simulation program, the fault simulation program may cause the computer to operate as pattern sorting means which sorts the plurality of test pattern sets in descending order according to the length of each test pattern set; and pattern scheduling means which schedules the plurality of test pattern sets sorted by the pattern sorting means, and rearranges the plurality of test pattern sets into a parallel test pattern while maintaining the sequentiality of each test pattern set.

As a result, each test pattern set can be handled as independently of the other test pattern sets while the order of processing in which test patterns are simulated within each test pattern set are maintained.

In the fault simulation method, the writing of data into the storage element is monitored at the time of the true-value simulation. When the writing of data into the storage element—to which a fault is propagated from the forward circuit area at certain observation time—is detected during true-value simulation, the value of the fault is stored, and the value of the fault is read at a later observation time and is propagated to the backward circuit area from the output pins of the storage element.

The fault simulation apparatus may comprise: a writing operation monitoring section for monitoring the writing of data into the storage element while the parallel pattern true-value simulation section is performing simulation; a fault value memory section for storing the value of a fault to be written into the storage element; a fault value writing section which, in a case where, during the true-value simulation, the writing operation monitoring section detects the writing of data into the storage element to which a fault is propagated from the forward circuit area at a certain observation time, writes the fault value into the fault value memory section; and a fault value reading circuit which at a later observation time reads the fault value from the fault value memory section and propagates the thus-read fault value to the backward circuit area from output pins of the storage element.

In the storage medium storing the fault simulation program, the fault simulation program may cause the computer to operate as writing operation monitoring means for monitoring the writing of data into the storage element while the parallel pattern true-value simulation means is performing simulation; fault value writing means which, in a case where, during the true-value simulation, the writing operation monitoring section detects the writing of data into the storage element to which a fault is propagated from the forward circuit area at a certain observation time, writes the fault value into a fault value memory section; and fault value reading means which at a later observation time reads the fault value from the fault value memory section and propagates the thus-read fault value to the backward circuit area from output pins of the storage element.

As a result, the fault can be passed from the observation time of the past to the observation time of the present. Namely, the fault can be passed through the storage element from the input pins to the output pins. Accordingly, it becomes possible to detect a fault in a path which is activated by transient pulse outputs such as pulses generated through chopping operation.

In the fault simulation method, circuit branch points in the integrated circuit are detected in advance. In a case where a test pattern used for detecting a certain fault is prepared, from the previously-detected circuit branch points, there is searched a first circuit branch point on the output side with respect to a network where the fault is assumed to arise. From a route between the thus-searched circuit branch point and at least one circuit branch point on the stage preceding the searched circuit branch point, there is searched an activation path which is activated and becomes able to detect a fault at the time of detection of the fault. An undetected fault which is present in the activation path may be taken as a detected fault.

The fault simulation apparatus may comprise a circuit branch point detection section for detecting circuit branch points in the integrated circuit in advance; a circuit branch point search section which, in a case where a test pattern used for detecting a certain fault is prepared, searches a first circuit branch point from the circuit branch points detected by the circuit branch point detection section, the first circuit branch point being on the output side with respect to a network where the fault is assumed to arise; and an activation circuit search section for searching, from a route between the circuit branch point searched by the circuit branch point search section and at least one circuit branch point on the stage preceding the searched circuit branch point, an activation path which is activated and becomes able to detect a fault at the time of detection of the fault, wherein an undetected fault which is present in the activation path is set to a detected fault.

In the storage medium storing a fault simulation program, the fault simulation program may cause the computer to operate as circuit branch point detection means for detecting circuit branch points in the integrated circuit in advance; circuit branch point search means which, in a case where a test pattern used for detecting a certain fault is prepared, searches a first circuit branch point from the circuit branch points detected by the circuit branch point detection means, the first circuit branch point being on the output side with respect to a network where the fault is assumed to arise; and activation circuit search means for searching, from a route between the circuit branch point searched by the circuit branch point search means and at least one circuit branch point on the stage preceding the searched circuit branch point, an activation path which is activated and becomes able to detect a fault at the time of detection of the fault, wherein an undetected fault which is present in the activation path is set to a detected fault.

As a result, when a test pattern used for the purpose of detecting a certain undetected fault is prepared, another undetected fault in the activation path, which fault can be reliably detected by means of the test pattern, is taken as a detected fault. There is avoided selection of the undetected fault, enabling elimination of the need to prepare a redundant (or excess) test pattern.

In the fault simulation method, in a case where the scan flip-flop of the integrated circuit has a master-slave latch configuration, propagation of events from a slave latch located in the backward circuit area may be stopped in a clock-off simulation associated with the true-value simulation which is performed to detect a fault in advance, while an event may be propagated only from the slave latch located in the forward circuit area.

In a case where the scan flip-flop of the integrated circuit has a master-slave latch configuration, the fault simulation apparatus may have a flag setting section for setting a flag with regard to the slave latch which is separated by means of the circuit isolation section so as to belong to the forward circuit area. In a clock-off simulation, the parallel pattern true-value simulation section may refer to the flag set by the flag setting section to thereby suspend propagation of an event from the slave latch belonging to the backward circuit area, as well as to propagate an event only from the slave latch belonging to the forward circuit area.

In the storage medium storing a fault simulation program, in a case where the scan flip-flop of the integrated circuit has a master-slave latch configuration, the fault simulation program may cause the computer to operate as flag setting means for setting a flag with regard to the slave latch which is separated by means of the circuit isolation section so as to belong to the forward circuit area. In a clock-off simulation, true-value simulation means may be activated in such a way as to refer to the flag set by the flag setting section, to thereby suspend propagation of an event from the slave latch belonging to the backward circuit area, as well as to propagate an event only from the slave latch belonging to the forward circuit area.

In view of a traceable forward region with reference to the slave latch, the forward circuit area can be recognized to include a storage element, and the backward circuit area can be recognized to comprise solely a combinational circuit. As mentioned previously, an event is propagated solely from the slave latch belonging to the forward circuit area, and the slave latch belonging to the backward circuit area suspends propagation of an event. As a result, a redundant true-value simulation can be prevented.

As described above, the fault simulation method, the fault simulation apparatus, and the storage medium storing the fault simulation program can provide the following advantageous results:

[1] A fault in the forward circuit area that is propagated to the input pins of the storage element at an observation time of the past is temporarily written into the storage element. At the observation time of the present, the thus-written fault is read from the storage element and propagated to the backward circuit area from the output pins. Accordingly, the fault in the forward circuit area can be taken in the same way as is a fault in the backward circuit. The fault in the forward circuit area—which is not detected by fault simulation through use of a conventional parallel test pattern—can be taken as an object to be detected. Therefore, a sufficient diagnostic rate can be ensured.

[2] It is not necessary to manage fault lists, as in the concurrent method, nor is it necessary to sequentially perform simulation every one test pattern. A plurality of test patterns can be simulated in parallel, thereby contributing to increasing the speed of fault simulation.

[3] The order of processing in which test patterns are simulated within each test pattern set is maintained, and each test pattern set can be handled independently of other test pattern sets. Accordingly, a plurality of test pattern sets can be simulated in parallel.

[4] A fault can be propagated from an observation time of the past to the observation time of the present. Namely, a fault can be passed through the storage element from the input pins to the output pins, thereby enabling detection of a fault in a path which is activated by transient pulse outputs such as pulses generated through chopping operation. This greatly contributes to an improvement in the diagnostic rate.

[5] When a test pattern for detecting a certain undetected fault is generated, another undetected fault in the activation path, which fault can be reliably detected by means of the test pattern, is taken as a detected fault. There is eliminated selection of the undetected fault, and the preparation of a redundant test pattern can be inhibited, thereby contributing to increasing the speed of the fault simulation.

[6] In the clock-off simulation, an event is propagated solely from the slave latch belonging to the forward circuit area, and the slave latch belonging to the backward circuit area suspends propagation of an event. In the backward circuit area, simulation (redundant processing)—which is performed through use of a value captured by the master latch in rising of a clock signal inputted to the master latch is inhibited. Simulation is performed only in the forward circuit area through use of the captured value. Accordingly, the number of events is reduced, thereby significantly increasing the speed of the true-value simulation.

BRIEF DESCRIPTION OF THE DRAWINGS

FIGS. 9(a) and 9(b) are schematic representations for explaining specific procedures of a test pattern arrangement method according to the embodiment, wherein FIG. 9(a) shows an example of pattern numbers of accumulated test pattern sets and FIG. 9(b) shows an example of pattern lengths of the test pattern sets;

FIGS. 10(a) and 10(b) are schematic representations for explaining specific procedures of the test pattern arrangement method according to the embodiment, wherein FIG. 10(a) shows an example of pattern numbers of sorted test pattern sets and FIG. 10(b) shows an example of pattern lengths of the test pattern sets;

FIG. 11 is a schematic representation which explains specific procedures (e.g., pattern scheduling operation) of the test pattern arrangement method according to the present embodiment and shows an example of a matrix of pattern numbers;

FIG. 12 is a schematic representation which explains specific procedures (e.g., pattern scheduling result) of the test pattern arrangement method according to the present embodiment and shows an example of the matrix of pattern numbers;

FIG. 13 is a schematic representation which explains a specific example of the test pattern arrangement method and shows an example of schedule flags;

FIGS. 14(a) and 14(b) are schematic representations for explaining specific procedures of the test pattern arrangement method according to the embodiment, wherein FIG. 14(a) shows an example of pattern numbers of remaining test pattern sets and FIG. 14(b) shows an example of pattern lengths of the test pattern sets;

FIG. 15(a) is a circuit diagram showing a storage element to which the fault passage method according to the present embodiment is applied;

FIG. 15(b) is a timing chart showing the operation of the storage element at the time of true-value simulation;

FIG. 16(a) is an operation truth table of the storage element shown in FIG. 15(a);

FIG. 16(b) is a table showing the contents of a true-value memory;

FIGS. 18(a) to 18(e) are diagrammatic representations for explaining the fault passage method according to the present embodiment applied to the storage element shown in FIG. 15(a);

DESCRIPTION OF THE PREFERRED EMBODIMENT

A preferred embodiment of the present invention will be described hereinbelow with reference to the accompanying drawings.

[0] Explanation of Terminology

First, there will be provided the definitions of various types of terms used hereunder to describe the embodiment of the present invention.

"Integrated Circuit": LSI or LSI-equipped printed board

"Storage Element": RAM, No-scan FF/latch macro (element) "No-scan FF/latch macro element" indicates a macro element, such as a flip-flop or a latch, which is not designed so as to enable full scanning operation.

"Combinational Circuit": a circuit—which is formed solely from logic elements but does not include a storage element, —or a circuit designed so as to enable full-scanning operation.

Figure 8:
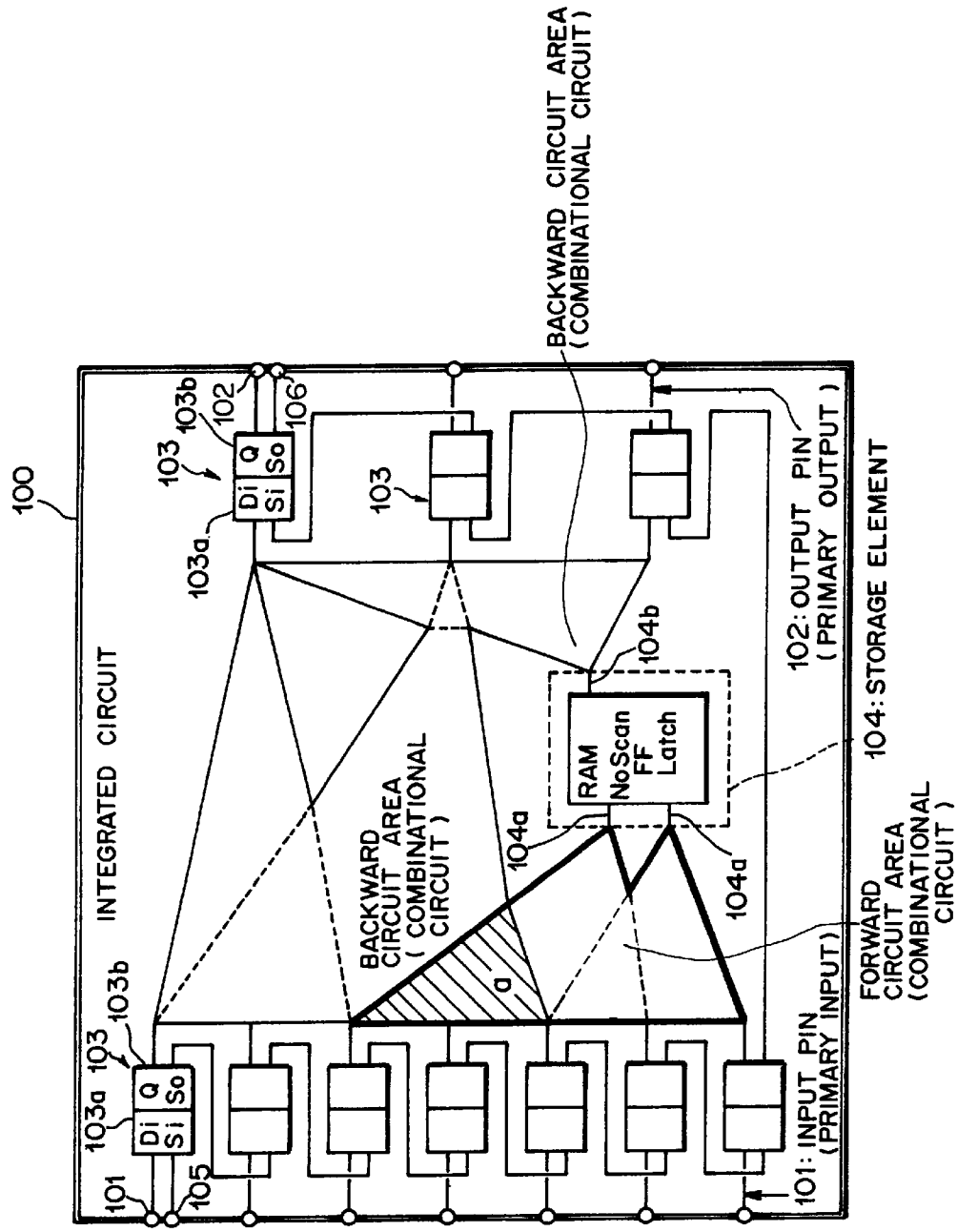
FIG. 8 is a circuit diagram showing a forward circuit area and a backward circuit area in an integrated circuit of the embodiment.

"Forward Circuit Area": an area including all combinational circuits which can be traced through back tracing started from input pins of the storage element to scan-in points or primary input terminals (see FIG. 8).

"Backward Circuit Area": an area including all combinational circuits which can be traced through back tracing started from scan-out points or primary output terminals to the output pins of the storage element, the scan points, and the primary input terminals (see FIG. 8).

Figure 1:
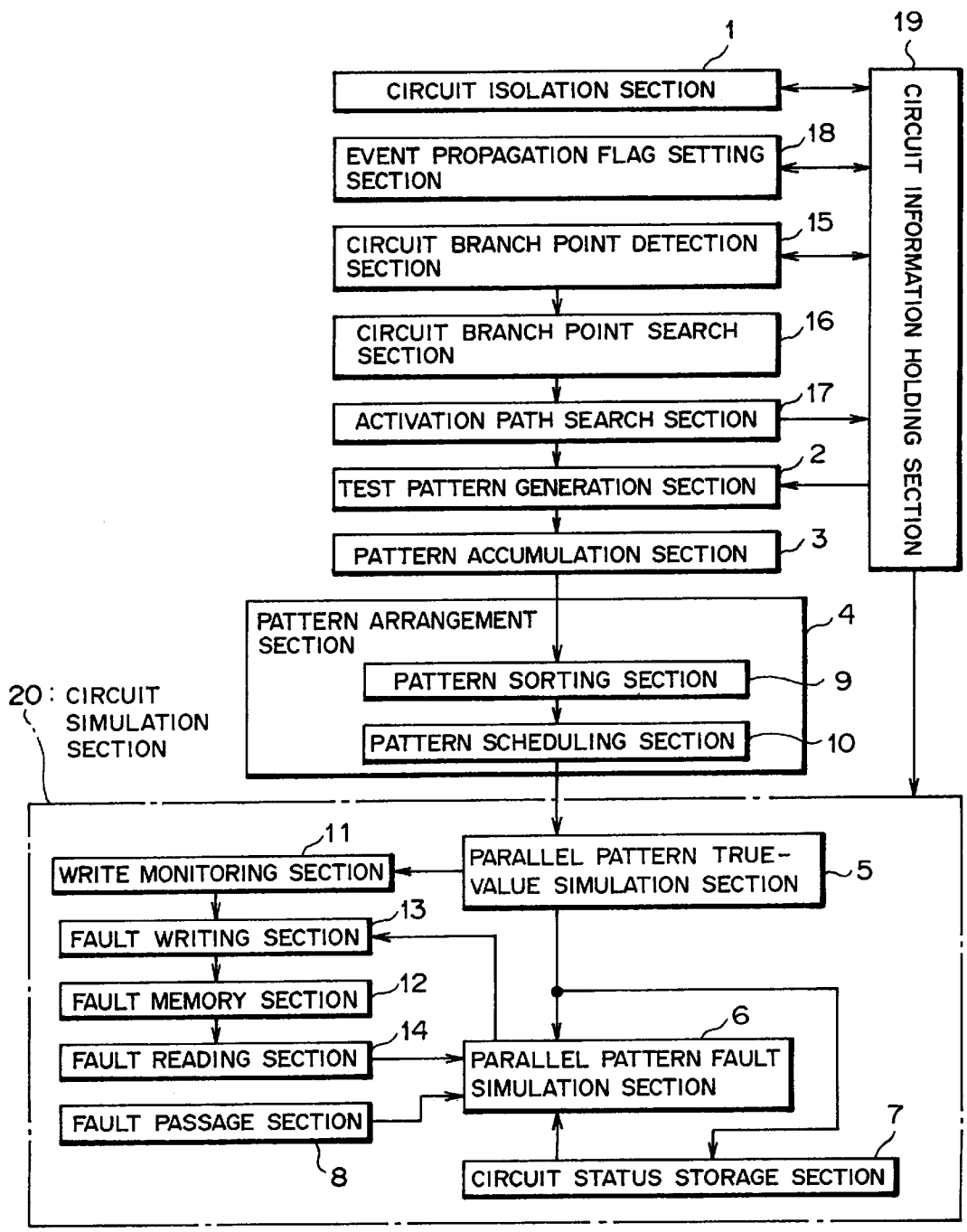
FIG. 1 is a block diagram showing the configuration of a fault simulation apparatus according to one embodiment of the present invention.

"Combinational Test Pattern": a minimum test pattern unit of test pattern length "n" [n (natural number)≧1] required to detect a single or a plurality of faults and generated by a test pattern generation section (designated by reference numeral 2 in FIG. 1).

"Observation Time of the Present": when a test pattern has a series of patterns of length "n," an instant when simulation—which is performed on the basis of an i-th test pattern (1≦i≦n)—is observed at the time of entry of the i-th test pattern.

"Observation Time of the Past": an instant when simulation—which is performed on the basis of a j-th test pattern (j<i) input before the entry of the i-th test pattern—is observed.

"Circuit Status of the Present": the state of a circuit at the observation time of the present (i.e., the state of a network or the internal state of a storage element).

"Circuit Status of the Past": the state of a circuit at the observation time of the past (i.e., the state of a network or the internal state of the storage element).

With reference to FIG. 8, an explanation will be given of an integrated circuit to be subjected to fault detection in the present embodiment, the foregoing forward circuit area, and the backward circuit area.

As shown in FIG. 8, input pins 101 and output pins 102 of an integrated circuit 100 to be subjected to fault detection are respectively connected to scan flip-flops 103. Each scan flip-flop 103 is formed from a master latch 103a and a slave latch 103b connected in tandem with the master latch 103a.

A signal input to each input pin 101 is received by the master latch 103a from a data-in terminal Di and is delivered to the inside of the integrated circuit 100 via an output terminal Q of the slave latch 103b. A signal output from the inside of the integrated circuit 100 is sent to the master latch 103a via the data-in terminal Di and is output to the outside from each output pin 103 via the output terminal Q of the slave latch 103b.

At the scan input end of the integrated circuit 100, a scan-in pin 105 is connected to a scan-in terminal Si of the master latch 103a of the scan flip-flop 103 (e.g., a scan flip-flop indicated in an upper left area in FIG. 8). At the scan output end of the integrated circuit 100, a scan-out pin 106 is connected to a scan-out terminal So of the slave latch 103b of the scan flip-flop 103 (e.g., a scan flip-flop indicated in an upper right area in FIG. 8).

The scan flip-flops 103 in the integrated circuit 100 are connected together in the form of a chain, by connection of the scan-out terminals So of the scan flip-flops 103 on a preceding stage to the scan-in terminals Si of the scan flip-flops 103 on the subsequent stage.

In the example shown in FIG. 8, the area surrounded by a bold line constitutes a forward circuit area (i.e., a combinational circuit). The forward circuit area is a region consisting of combinational circuits which can be traced through back tracing started from input pins 104a of a storage element (RAM, No-scan flip-flop/latch) 104 of the integrated circuit 100 to the scan-in points (i.e., the output terminals Q) or primary input terminals (i.e., the input pins 101).

In contrast, a backward circuit area is a region consisting of combinational circuits which can be traced through back tracing started from the scan-out points (i.e., the data-in terminals Di) or primary output terminals (i.e., the output pins 102) to the output pins 104b of the storage element 104, the scan-in points (i.e. the output terminals Q), or the primary input terminals (i.e., the input pins 101). As represented by a hatched area "a" shown in FIG. 8, in the area where the forward circuit area and the backward circuit area overlap, the forward circuit area is prioritized.

[1] Description of the Configuration of the Fault Simulation Apparatus

FIG. 1 is a block diagram showing the configuration of a fault simulation apparatus according to a first embodiment of the present invention. As shown in FIG. 1, the fault simulation apparatus according to the first embodiment is intended to detect a fault in an integrated circuit through use of test patterns. In practice, in a computer comprising a keyboard, a mouse, a display, a CPU, ROM, and RAM, fault simulation is implemented by reading a fault simulation program from a storage medium, such as a hard disk, a magnetic tape, a floppy disk, an optical disk, an optical magnetic disk, or a CD-ROM, and by execution of the thus-read simulation program. The fault simulation program is used for causing a computer to operate in each of its functional blocks; namely, blocks designated by reference numerals 1, 2, 4 to 6, 8 to 11, and 13 to 18 shown in FIG. 1.

As shown in FIG. 1, the fault simulation apparatus according to the first embodiment comprises a circuit isolation section 1; a test pattern generation section 2; a pattern accumulation section 3; a pattern arrangement section 4; a circuit branch point detection section 15; a circuit branch point search section 16; an activation path search section 17; an event propagation flag setting section (a flag setting section) 18; a circuit information holding section 19; and a circuit simulation section 20. Such a fault simulation apparatus operates according to a flowchart (which will be described later) shown in FIGS. 2 through 7.

The pattern arrangement section 4 comprises a pattern sorting section 9 and a pattern scheduling section 10. The circuit simulation section 20 comprises a parallel pattern true-value simulation section 5; a parallel pattern fault simulation section 6; a circuit status storage section 7; a fault passage section 8; a write monitoring section 11; a fault memory section (or a fault value memory section) 12; a fault writing section (or a fault value writing section) 13; and a fault reading section (or a fault value reading section) 14.

The circuit information holding section 19 holds as circuit information a detected/undetected flag related to a fault assumed to arise in the network; a flag for designating a forward/backward circuit area related to a storage element 104 (see FIG. 8); and a flag related to an event propagated through the slave latch 103b of the scan flip-flop 103 (see FIG. 8), as well as the relationship of connections between networks and gate (macro) logic functions of the integrated circuit 100 (see FIG. 8) to be subjected to fault detection.

The circuit isolation section 1 divides the integrated circuit 100 into a backward circuit area (a combinational circuit area; see FIG. 8), which is connected to the output pins 104b of the storage element 104 included in the integrated circuit 100, and a forward circuit area (a combinational circuit area; see FIG. 8), which is connected to the input pins 104a of the storage element 104.

The test pattern generation section (ATPG: Automatic Test Pattern Generator)2 automatically generates a test pattern set of test pattern length "n" ($\geq 1$) for the purposes of detecting one or a plurality of faults by means of a decision-theory algorithm such as a D algorithm or POEM. The pattern generation section 2 generates a test pattern in cooperation with a test pattern generation method which will be described later with reference to FIGS. 5 and 19.

The pattern accumulation section 3 stores and saves a plurality of test pattern sets, which are prepared by the test pattern generation section 2, and the lengths of the test patterns by copying them into a buffer in the pattern accumulation section 3.

The pattern arrangement section 4 rearranges the plurality of test pattern sets stored in the buffer within the pattern accumulation section 3 into m-parallel x n-sequential test patterns. As mentioned previously, the pattern arrangement section 4 comprises the pattern sorting section 9 and the pattern scheduling section 10.

The pattern sorting section 9 sorts the test pattern sets stored in the pattern accumulation section 3 according to the test pattern length of each test pattern set. The pattern scheduling section 10 converts the plurality of test pattern sets into m-parallel x n-sequential test patterns (i.e., parallel test patterns) by scheduling the plurality of test pattern sets sorted by the pattern sorting section 9 without division of each test pattern set, while maintaining the sequentiality of each test pattern set.

The detailed operation of the pattern arrangement section 4 having the foregoing configuration will be described later with reference to FIGS. 3 and 9 to 14.

An additional, brief explanation will be given of the "m-parallel x n-sequential test patterns." The symbol "m" designates the degree of parallelism of a parallel simulation, and the symbol "n" designates the length of the longest test pattern included in the test pattern sets stored in the pattern accumulation section 3. Accordingly, the expression "m-parallel x n-sequential test patterns" signifies the sequential entry from the $1^{st}$ to n-th test patterns of parallel test patterns having the degree "m" of parallelism into the simulation sections 5, 6, which will be described later.

The parallel pattern true-value simulation section 5 simulates a circuit status "i" through use of the i-th ($1 \leq i \leq n$) parallel test pattern. True-value simulation is performed in a fault-free state by inputting the parallel test pattern to the integrated circuit 100. At the time of a clock-off simulation, the parallel pattern true-value simulation section 5 operates in cooperation with true-value simulation speed-increasing method which will be described later with reference to FIG. 6.

The parallel pattern fault simulation section 6 detects a fault by inputting and propagating a fault into the integrated circuit 100 in the circuit status "i" after stabilization of the true-value simulation performed through use of the i-th parallel test pattern, and by checking at an observation point whether or not there is a difference between the propagated fault and the result of the true-value simulation.

The circuit status storage section 7 stores the circuit status "i" at the observation time.

The fault passage section 8 is intended to propagate the fault—which has been propagated to the storage element 104 from the forward circuit area in a circuit status "j" (<i)—to a circuit area backward of the storage element 104 at the instant when the circuit status "i" is observed. More specifically, in a case where from the forward circuit area, a fault is propagated to the input pins 104a of the storage element 104 during the simulation performed by the parallel pattern fault simulation section 5, the fault passage section 8 writes the value of the fault into the storage element 104 at the observation time "j." The value of the fault is read from the storage element 104 at a subsequent observation time "i" and is propagated to the backward circuit area from the output pins 104b of the storage element 104.

The write monitoring section 11 is intended to monitor whether or not data are written into the storage element 104 while the true-value simulation is performed through use of the i-th parallel test pattern; namely, whether or not there is propagated a clock signal which induces writing of data into the storage element 104.

The fault memory section 12 stores the value of fault written into the storage element 104.

In a case where the write monitoring section 11 monitors the writing of data into the storage element 104 during the true-value simulation for the circuit status "j" when the fault is propagated to the storage element 104 from the forward circuit area during the fault simulation for the circuit status "j" (<i), the fault writing section 13 writes the value of the fault into the storage element 104 by supplying a write clock signal to the storage element 104, and simultaneously writes the same fault value into the fault memory section 12.

The fault reading section 14 reads the fault value—which is written into the fault memory section 12 in the circuit status "j" (<i)—from the fault memory section 12 in the circuit status i (>j). The thus-read fault value is propagated to the backward circuit area from the output pins 104b of the storage element 104.

With reference to FIGS. 4 and 15 through 18, the detailed operations of the write monitoring section 11, the fault memory section 12, the fault writing section 13, and the fault reading section 14 will be described.

At the time of initialization, the circuit branch point detection section 15 detects in advance, as circuit branch points, output pins of gates (or macro element) having a plurality of fanouts or an input terminal of a gate (or a macro element) having a plurality of output terminals in the integrated circuit.

In a case where the test pattern generation section 2 has succeeded in preparing a test pattern for the purpose of detecting a selected fault, the circuit branch point search section 16 searches, from the circuit branch points previously detected by the circuit branch point detection section 15, a first circuit branch on the output side with respect to a network where the fault is assumed to arise.

In the circuit status set by the test pattern generation section 2 in order to produce a test pattern, the activation path search section 17 searches an activation path—which is activated and becomes able to detect a fault at the time of detection of the fault—from a route between the circuit branch point searched by the circuit branch point search section 16 and at least one circuit branch point on the stage preceding the searched circuit branch point. An undetected fault—which is present in the activation path—is set in the circuit information holding section 19 as being a detected fault.

Figure 5:
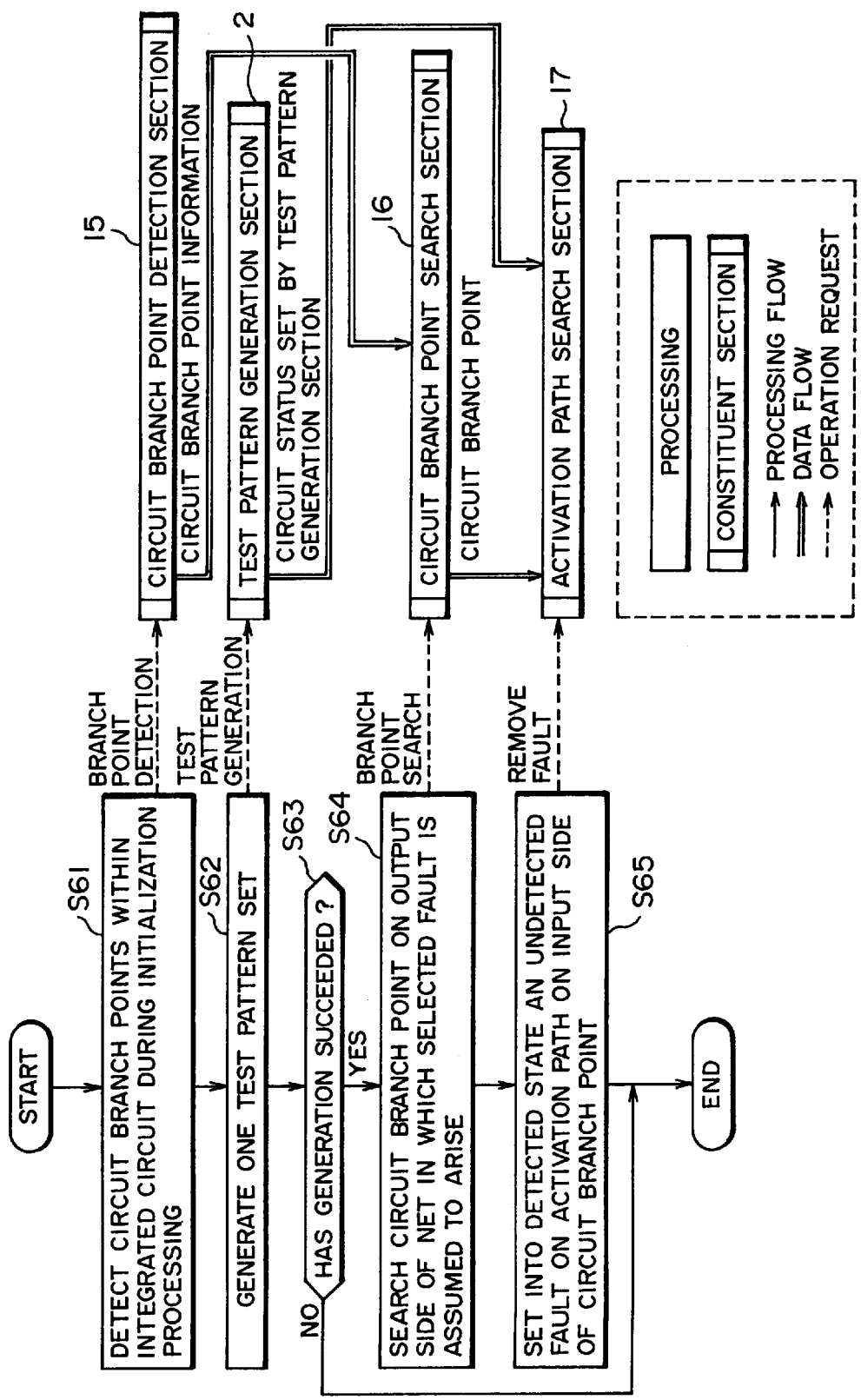
FIG. 5 is a flowchart for explaining the procedures of a test pattern generation method according to the present embodiment with reference to correspondence between the procedures and constituent sections which actually execute the procedures.
Figure 6:
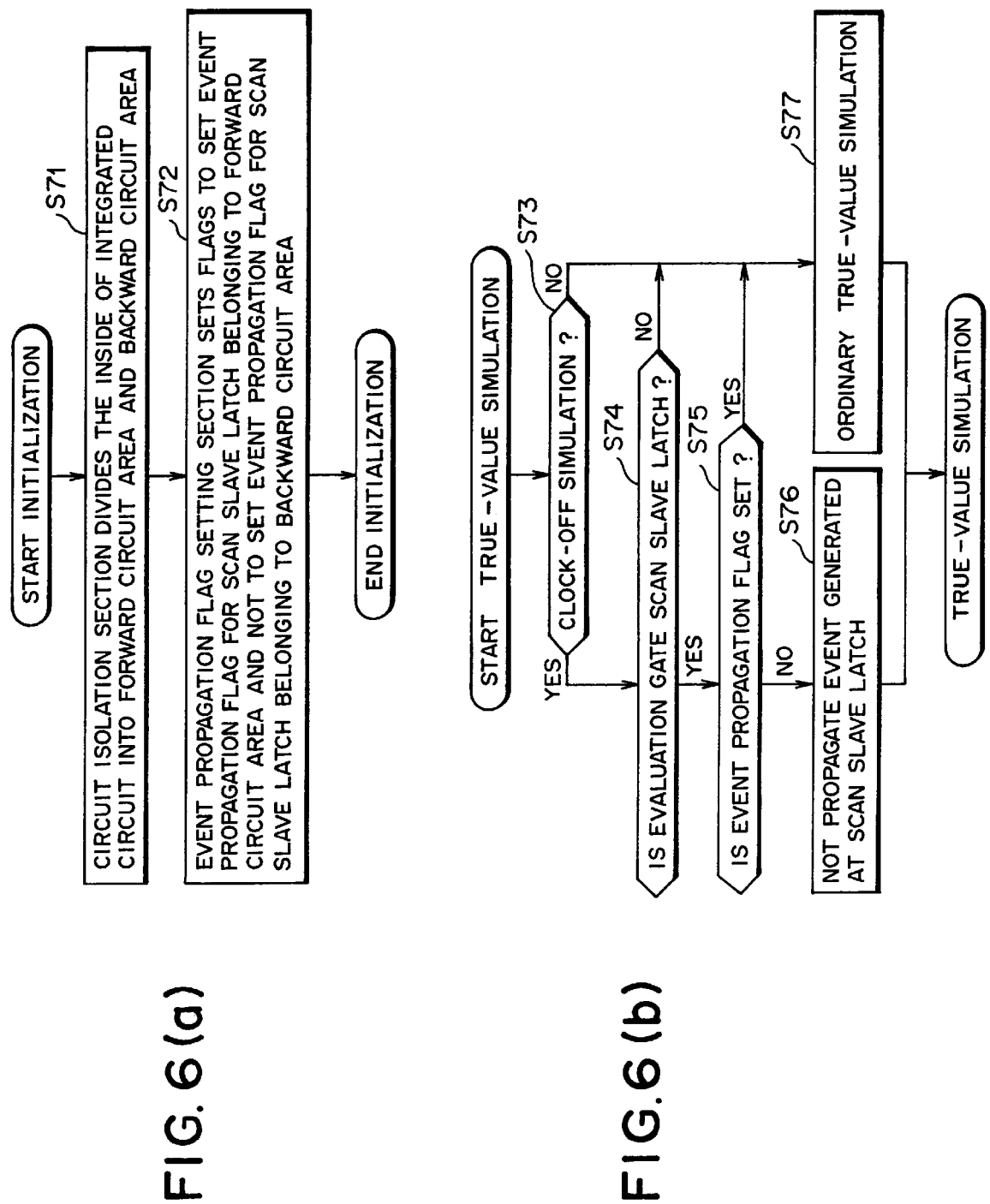
FIGS. 6(a) and 6(b) are flowcharts for explaining true-value simulation speed-increasing method according to the present embodiment.

With reference to FIGS. 5 and 19, the detailed operation of the circuit branch point detection section 15, the circuit branch point search section 16, and the activation path search section 17 will be described.

The event propagation flag setting section 18 sets a flag in the circuit information holding section 19 for sending an instruction to the slave latch 103b of the scan flip-flop 103 isolated by the circuit isolation section 1 so as to belong to the forward circuit area. The instruction is intended to instruct the slave latch 103b to propagate an event during the clock-off simulation.

During the clock-off simulation, the parallel pattern true-value simulation section 5, according to the embodiment, refers to the event propagation flag set in the circuit information holding section 19 by the event propagation flag setting section 18. If the event propagation flag is not set with regard to the slave latch 103b, the parallel pattern true-value simulation section 5 suspends the propagation of events (namely, the propagation of events from the slave latches 103b belonging to the backward circuit area is suspended). The parallel pattern true-value simulation section 5 permits propagation of an event from solely the slave latch 103b with regard to which the event propagation flag is set; i.e., the slave latch 103b belonging to the forward circuit area. These operations will be described later in detail with reference to FIG. 6.

[2] Description of Fault Simulation Method

Figure 2:
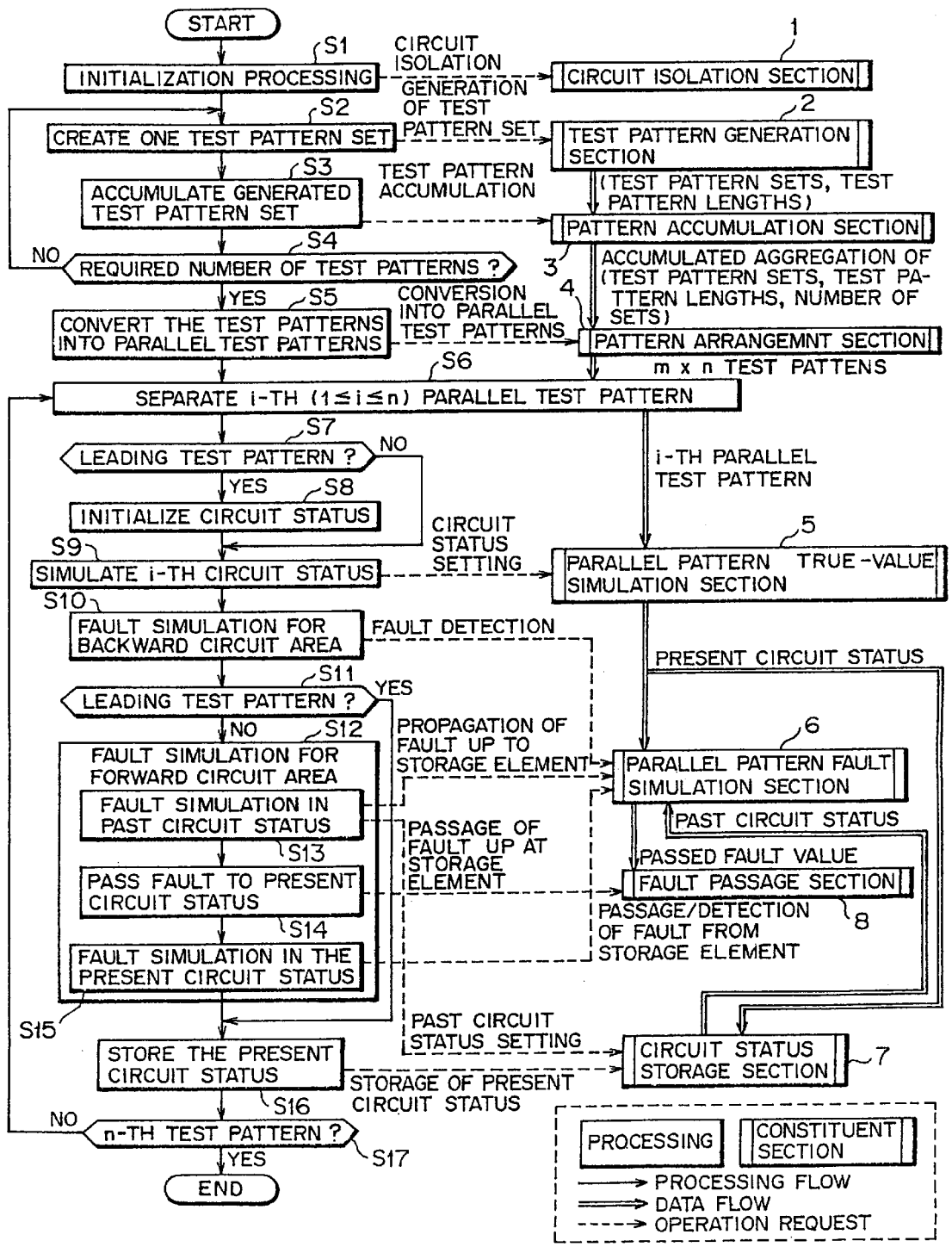
FIG. 2 is a flowchart for explaining the procedures of a fault simulation method according to the present embodiment with reference to correspondence between the procedures and constituent sections which actually execute the procedures.

The essential procedures of the fault simulation method according to the present embodiment will be described with reference to a flowchart (steps S1 to S17) shown in FIG. 2. FIG. 2 illustrates the correspondence between the procedures (i.e., steps and processing) of the fault simulation method according to the present embodiment and the constituent sections that actually perform the procedures.

As shown in FIG. 2, at initialization the circuit isolation section 1 divides the inside of the integrated circuit 100 into the forward circuit area and the backward circuit (step S1). The test pattern generation section 2 generates test pattern sets one by one (step S2). The thus-generated test pattern sets and their lengths are sequentially stored in the pattern accumulation section 3 (step S3). An operation request is sent to the test pattern generation section 2 (NO in step S4) so that the test pattern generation section 2 generates a new test pattern set until the number of test patterns required to execute simulation are accumulated in the pattern accumulation section 3 (until YES is selected in step S4). Steps S2 and S3 are executed repeatedly.

When the number of test patterns required to perform simulation are stored in the pattern accumulation section 3 (YES in step S4), the pattern arrangement section 4 arranges the plurality of test pattern sets into m-parallel x n-serial test patterns on the basis of the plurality of test pattern sets, the length of each test pattern set, and the number of test pattern sets (or the number of sets) stored in the pattern accumulation section 3 (step S5).

Subsequently, the m-parallel x n-serial test patterns are sequentially separated into a single piece from the $1^{st}$ to the n-th pattern (step S6). The i-th ($1 \leq i \leq n$) parallel test pattern is subjected to steps S7 to S17, which will be described later.

First, it is determined whether or not the i-th test pattern set is the leading test pattern, or whether or not i=1 (step S7). If this is the case (or if i=1; YES in step S7), networks and the state of memory to be handle by the simulation sections 5, 6 are initialized (step S8).

If the i-th test pattern set is not the leading test pattern (i>1; NO in step S7), the initialization of the networks or memory is not performed. There is maintained the order and relationship between the state of the circuit obtained after simulation has been performed through use of the parallel test pattern entered in the past and the state of the circuit obtained after simulation has been performed through use of the parallel test pattern entered at the present.

The true-value simulation section 5 performs simulation through use of the i-th parallel test pattern as an input until the circuit becomes stable, thereby setting the circuit status "i" (step S9). The circuit status "i" obtained after simulation has been performed through use of the i-th parallel test pattern is the current circuit status.

In the circuit status "i," the fault simulation section 6 detects an undetected fault assumed to arise in the backward circuit area (step S10).

It i s again determined whether or not the i-th test pattern set is the leading test pattern; i.e., whether or not i=1 (step S11). In a case where the test pattern set is the leading test pattern (i=1; YES in step S11), the processing proceeds to step S16 by bypassing steps S12 to S15.

In contrast, in a case where the i-th test pattern is not the leading test pattern (i>1; NO in step S11), fault simulation is performed with regard to the forward circuit area (step S12).

That is, in the circuit status "j" (<i); i.e., the circuit status of the past stored in the circuit status storage section 7, the fault simulation section 6 detects an undetected fault assumed to remain in the forward circuit area (step S13).

In a case where a fault is propagated to the storage element 104 from the forward circuit area during the fault simulation performed in step S13, the fault passage section 8 permits the fault to pass to the circuit area backward of the storage element 104 in the circuit status "i"; i.e., the circuit status of the present (step S14). Subsequently, the fault simulation section 6 detects another fault in the circuit status "i" of the present (step S15).

If the i-th test pattern is determined to be the leading test pattern in step S11 (YES), or after step S15 has been completed, the circuit status "i" of the present is stored in the circuit status storage section 7 (step S16). The thus-stored circuit status "i" is the circuit status of the past with regard to the k-th (k>i) parallel test pattern which will be entered later.

The foregoing steps S6 to S16 are repeatedly performed until "i" becomes equal to "n" and the processing with regard to the n-th test pattern is completed; namely, until YES is selected in step S17.

In the fault simulation method according to the present embodiment, the fault occurred in the forward circuit area is propagated to the input pins 104a of the storage element 104 in the circuit state of the past stored in the circuit status storage section 7. The fault passage section 8 permits the fault to pass to the output pins of the storage element in the circuit status of the present and is propagated as a fault output from the output pins 104b of the storage element 104. Accordingly, the fault occurred in the forward circuit area can be handled, as is the fault occurred in the backward circuit area.

As mentioned above, a fault occurred in the forward circuit area that cannot be detected by the conventional fault simulation performed through use of parallel test patterns can be handled as an object to be detected, thereby ensuring a sufficient diagnostic rate.

Further, unlike the concurrent method, management operation for fault lists is not required, the simulation is not necessary to be performed sequentially every one test pattern, and a plurality of test patterns can be simulated in parallel. Therefore, the speed of the fault simulation can be increased greatly.

[3] Description of a Test Pattern Arrangement Method

Next, an explanation will be given of a procedure (i.e., a test pattern arrangement method in the present embodiment) by which the pattern arrangement section 4 (comprising the pattern sorting section 9 and the pattern scheduling section 10) arranges the plurality of test pattern sets into m-parallel x n-sequential test patterns.

Consideration will be given to a case where the test pattern generation section 2 produces the test pattern set which takes into account the sequentiality of the storage element 104; namely, where there is produced a test pattern set P (P1, P2, . . . , Pn) of test pattern length "n" in which reading of data follows the writing of data into the storage element 104.

In this case, it the parallel test patterns P1, P2, . . . , Pn are simulated independently of each other without consideration of the sequentiality of the test pattern set P, the writing and reading of data into or from the storage element 104 a re independently performed. The order of processing (i.e., P1→P2→ . . . , →Pn)—in which the writing of data into the storage element 104 is followed by the reading of the thus-written data from the storage element 104—is not taken into account. As a result, necessary data are not written into the storage element 104 at the time of the reading operation, and a status value of the circuit area connected to the output pins 104b of the storage element 104 becomes unstable, thereby making it impossible to detect a fault in the circuit area backward of the storage element 104.

In the present embodiment, the order of processing—in which the test patterns are simulated within each test pattern set—is maintained, and each test pattern set is handled as being independent of another test pattern set. A plurality of test pattern sets are simulated in parallel.

With reference to a flowchart (steps S21 to S34) shown in FIG. 3, the test pattern arrangement method according to the present embodiment (the details of step S5 shown in FIG. 2) will be described.

The test pattern sets produced by the test pattern generation section 2 and their pattern lengths are stored in the pattern accumulation section 3 in advance. Taking the number of test patterns required to perform a parallel simulation as m×n (i.e., a value used in judgment in step S4 shown in FIG. 2), a pattern generation request is sent to the test pattern generation section 2 until the number of test patterns stored in the pattern accumulation section 3 reaches a value of more than m×n. As mentioned previously, "m" indicates the degree of parallelism of a parallel simulation, and "n" indicates the length of the longest test pattern in the test pattern sets stored in the pattern accumulation section 3.

Figure 3:
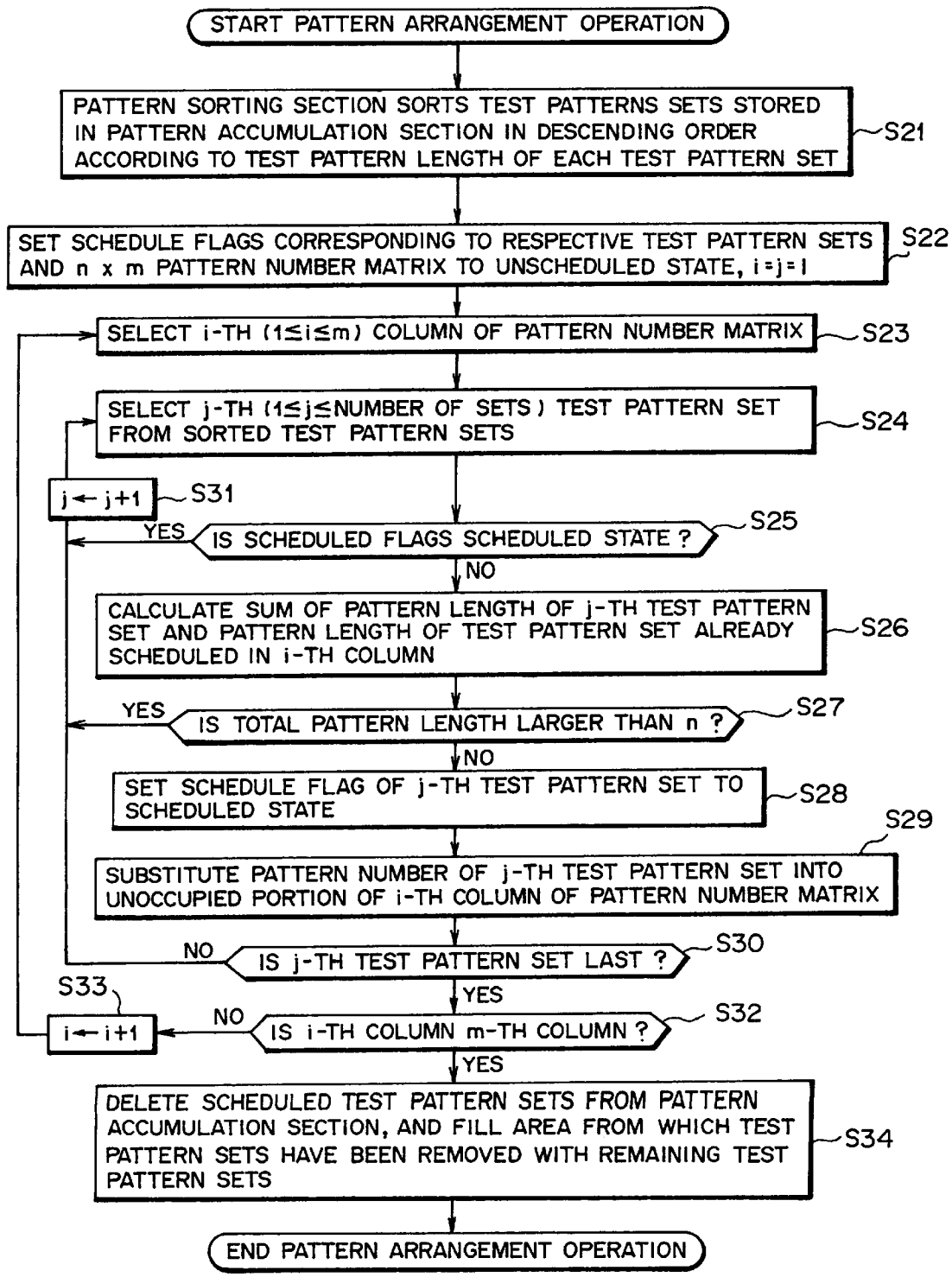
FIG. 3 is a flowchart for explaining a test pattern arrangement method according to the present embodiment.

As shown in FIG. 3, the pattern sorting section 9 sorts the plurality of test pattern sets stored in the pattern accumulation section 3 in descending order according to the test pattern length of each test pattern set, taking one test pattern set as a unit of exchange (step S21).

Subsequently, the processing related to steps S22 to S33 is executed by the pattern scheduling section 10.

First, in order to schedule (or rearrange) the plurality of test pattern sets into m-parallel×n-sequential test pattern, schedule flags (see FIG. 13) corresponding to the number of test pattern sets stored in the pattern accumulation section 3 and a pattern number matrix having a dimension of n×m (see FIGS. 11 and 12) are prepared. Here, "n" represents the number of rows and "m" the number of columns. All the schedule flags and the pattern number matrix are initialized to an "unscheduled" state (step S22). The following steps S23 to S32 are executed with regard to each of the columns, and the circuit status values are also set to i=j=1 at the time of initialization in step S22.

The i-th column ($1 \leq i \leq m$) of the pattern number matrix is selected (step S23), and the j-th ($1 \leq j \leq$ the number of sets) test pattern set is selected from the sorted test pattern sets (step S24). It is determined whether or not the schedule flag of the j-th test pattern set is set to a "scheduled" state (step S25).

If the schedule flag is not in a "scheduled" state or is in an "unscheduled" state (NO in step S25), the sum of the length of the j-th test pattern set and the length of the test pattern set already scheduled in the i-th column is calculated (step S26). It is determined whether or not the total length of patterns is greater than "n" (step S27). If the total length of patterns is smaller than "n" (NO in step S27), the schedule flag of the j-th test pattern set is set to a "scheduled" state (step S28). The number of j-th test pattern set is substituted into an unoccupied portion in the i-th column of the pattern number matrix (step S29). It is determined whether or not the j-th test pattern set is the last test pattern set. Namely, it is determined whether or not the "j" represents the number of sets (step S30).

If the schedule flag is determined to be in a "scheduled" state in step S25 (YES), if the total length of patterns is determined to exceed "n" in step S27 (YES), or if "j" is determined to be not the number of sets in step S30 (NO), a new value of "j" is set by addition of one to the current value of "j" (step S31), and the aforementioned steps S24 to S30 are repeatedly executed.

If "j" is determined to be the number of sets in step S30 (YES), it is further determined whether or not i=j (step S32). If "i" is determined to be not equal to "m" (NO), a new value of "i" is set by addition of one to the current value of "i" (step S33). The foregoing steps S23 to S32 are repeatedly executed. In contrast, if "i" is determined to be equal to "j" (YES), the scheduled test pattern sets are deleted from the pattern accumulation section 3. The area in the pattern accumulation section 3 from which the test pattern sets is removed is filled with the remaining test pattern sets (step S34), and the pattern arrangement operation is now completed.

The foregoing steps S23 to S33 can be summarized as the following items (a) to (e).

(a) The test pattern sets sorted in descending order by test pattern length are reviewed in order, and one test pattern set whose schedule flag is in an "unscheduled" state is selected (steps S24, S25, and S31).

(b) A total amount of the pattern length of the thus-selected test pattern set and the pattern length of the test pattern set already scheduled for the column of interest is calculated (step S26).

(c) In a case where the thus-calculated total length of test patterns is smaller than the maximum test pattern length "n" (NO in step S27), the schedule flag corresponding to the selected test pattern set is set to a "scheduled" state (step S28). The number of the thus-selected test pattern is substituted into the column of interest of the n-by-m matrix in such a way that the selected test pattern is joined to the already-scheduled test pattern sets, thereby scheduling the schedule flag (step S29).

(d) In a case where the calculated total length of test patterns is greater than the maximum test pattern length "n" (YES in step S27), the processing returns to item (a), and another test pattern set is selected (steps S31 and S24). The same processing is repeated.

(e) If there is not any test pattern set to be selected (YES in step S30), consideration will be given to the next column (steps S32 and S33).

Through processing mentioned previously, the test patterns having the numbers substituted into each of the rows of the n-by-m matrix are converted into the parallel test pattern which has the degree of parallelism "m" and is to be delivered to the simulation sections 5, 6.

The test pattern set scheduled as a result of the foregoing processing is deleted from the pattern accumulation section 3. In contrast, the unscheduled test pattern set is stored in the pattern accumulation section 3 and is shifted toward the leading end of the pattern accumulation section 3 (step S34).

With reference to FIGS. 9 through 14, specific procedures related to the test pattern arrangement method according to the present embodiment will now be described. The following descriptions are based on the assumption that the degree of parallelism "m" of the simulation sections (i.e., simulators) 5, 6 is 5.

One example of the test pattern sets—which are stored in the pattern accumulation section 3 at the time of commencement of the test pattern arrangement processing—is shown in FIGS. 9(a) and 9(b). FIGS. 9(a) and 9(b) show the number and lengths of the test pattern sets stored in the pattern accumulation section 3.

FIGS. 9(a) and 9(b) show the state of the test pattern sets stored in the pattern accumulation section 3; namely, a test pattern set consisting of test patterns 1, 2, 3 (and having a length of 3); a test pattern set consisting of a test pattern 4 (and having a pattern length of 1); a test pattern set consisting of a test pattern 5 (and having a pattern length of 1); a test pattern set consisting of test patterns 6, 7 (and having a pattern length of 2); a test pattern set consisting of test patterns 8, 9 (and having a pattern length of 2); a test pattern set consisting of test patterns 10, 11 (and having a pattern length of 2); a test pattern set consisting of test patterns 12, 13, 14 (and having a pattern length of 3); and a test pattern set consisting of test patterns 15, 16 (and having a pattern length of 2).

In short, in the example shown in FIGS. 9(a) and 9(b), the maximum pattern length "n" of the stored test pattern sets is 3. FIGS. 9(a) and 9(b) show one example of the state of the test patterns sets stored in the pattern accumulation section 3 at the instant when the total number of test patterns stored in the pattern accumulation section 3 has exceeded the number of test patterns required for simulation; i.e., m×n= 15, and the processing proceeds to the pattern arrangement section 4. In FIG. 9(a), a frame surrounded by a solid line indicates one test pattern set.

FIGS. 10(a) and 10(b) show the result of sorting of the test pattern sets—which are stored in such a manner as shown in FIGS. 9(a) and 9(b)—by the pattern sorting section 9 according to pattern length. FIGS. 10(a) and 10(b) show the numbers and lengths of the thus-sorted test pattern sets.

The pattern numbers are scheduled from the first column. In the example shown in FIG. 11, the test pattern sets having the maximum pattern length are scheduled. Namely, a test pattern set {1, 2, 3} is scheduled for the first column, and a test pattern set {12, 13, 14} is scheduled for the second column. In the third column, after a test pattern set {6, 7} has been scheduled, a test pattern set {8, 9} is selected. Since the amount of the pattern lengths (2+2=4) in the third column exceeds the maximum pattern length 3, the choice is rejected. Similarly, choices of the test pattern sets {10, 11} and {15, 16} are also rejected. In the third column, a test pattern set {4} having a pattern length 1 is scheduled in the end.

The plurality of test pattern sets such as those shown in FIG. 9(a) are converted into a 5-parallel×3-sequential test pattern such as that shown in FIG. 12 through repetition of the aforementioned processing.

In the case of the 5-parallel×3-sequential test pattern shown in FIG. 12, parallel test patterns {1, 12, 6, 8, 10} are input to a circuit simulation section 20 (i.e., simulation sections 5, 6) at the outset, so that true value/fault simulations are performed. Subsequently, parallel test patterns {2, 13, 7, 9, 11} are input to the circuit simulation section 20.

The cell labeled with "unscheduled" in the third row, the fifth column represents the test pattern is not scheduled for that cell. Accordingly, the cell is not subjected to observation during the simulation.

FIG. 13 shows that the sixth test pattern set {15, 16} is unscheduled.

Subsequently, as shown in FIGS. 14(a) and 14(b), the pattern scheduling section 10 processes unoccupied regions of the pattern accumulation section 3. More specifically, the unused test pattern set {15, 16} is shifted toward the leading end of the pattern accumulation section 3 according to the processing result such as that shown in FIGS. 12 and 13.

As mentioned previously, each test pattern set is not divided into different columns through conversion by the pattern arrangement section 4 in the present embodiment. The sequentiality of each test pattern is stored, and the test pattern sets in one column are handled as to be independent of the test pattern sets in another column. Therefore, a plurality of test pattern sets can be simulated in parallel.

[4] Description of Fault Passage Method

A description will be given of the fault passage method according to the embodiment which is implemented by means of the write monitoring section 11, the fault memory section 12, the fault writing section 13, and the fault reading section 14.

In a macro model for the storage element, there is a case where the circuit acquires data by means of chopping-like transient operations in response to the leading edge or trailing edge of an input clock signal, as does RAM. Under conventional method (1) in which a plurality of test patterns are simultaneously processed, as mentioned previously, a fault is injected into the integrated circuit after the integrated circuit has become stable through true-value simulation. The chopping-like transient operations occurred in the storage element like RAM have already subsided or ended at the time of implantation of a fault into the integrated circuit.

For this reason, even if a fault injected into the integrated circuit at a certain observation time is propagated to the storage element, the foregoing transient operation is not induced only by the event of the thus-propagated fault, and hence the fault is not written into the storage element. Accordingly, even in a case where the storage element performs a reading operation at a later observation time, a fault to be read is not written into the storage element. Therefore, the fault cannot pass through the integrated circuit from the input pin to the output pin between the instant when the fault is written into the storage element and the instant when the fault is read from the storage element. As a result, the fault propagated to the storage element cannot be detected.

Under method (1) previously mentioned, a fault is injected into the integrated circuit after the circuit has become stable through true-value simulation. Accordingly, it becomes impossible to detect a fault in a route which is activated by a chopping-like transient pulse output.

To prevent such an inconvenience, in the present embodiment, the write monitoring section 11 monitors whether or not a clock signal—which induces writing of data during the true-value simulation—is propagated to the storage element 104. In a case where the propagation of a clock signal for inducing a writing operation to the storage element 104 is detected when a fault injected into the integrated circuit after the circuit has become stable through true-value simulation arrives at the storage element 104, a fault is written into the storage element 104 by intentionally supplying a write clock signal to the storage element 104, the fault written into the storage element 104 is read when the storage element 104 performs a reading operation at a later observation time. As a result, the fault is allowed to pass from an observation time of the past to an observation time of the present. Namely, the fault is allowed to pass through the storage element 104 from the input pins 104a to the output pins 104b.

With reference to a flowchart (steps S41 to S56) shown in FIG. 4, the fault passage method according to the present embodiment will be described. The fault passage method is executed together with the foregoing elementary fault simulation method according to the present embodiment.

Figure 4:
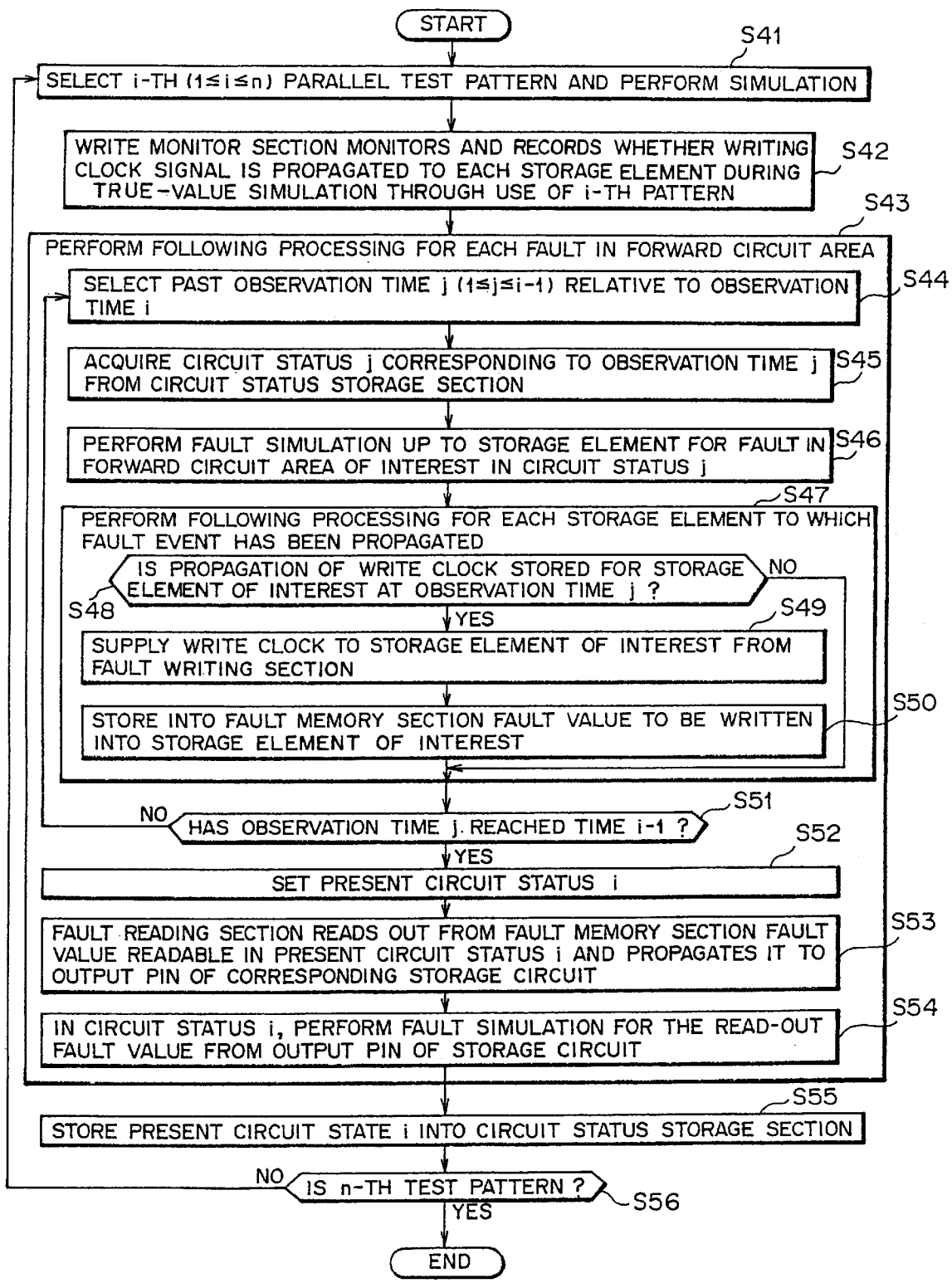
FIG. 4 is a flowchart for explaining a fault passage method according to the present embodiment.

As shown in FIG. 4, the m-parallel×n-sequential test patterns are sequentially separated into parallel test patterns one by one from the first pattern to the n-th pattern. Simulation is performed through use of the i-th parallel test pattern (step S41).

The write monitoring section 11 monitors whether or not data are written into the storage element 104 during the true-value simulation based on the i-th ($1 \leq i \leq n$) parallel test pattern. That is, the write monitoring section 11 monitors and records whether or not the write clock signal is propagated to each storage element (step S42). A RAM, a latch, or a flip-flop, each of which is in synchronism with a clock signal, monitors or stores whether or not an event—which induces an inherent writing operation specified by the type of storage element—has been propagated to a clock pin.

As previously mentioned with reference to FIG. 2, provided that the current state of a circuit is "i," and the past state of the circuit stored in the circuit status storage section 7 is j ($<i$), a fault assumed to arise in the circuit area forward of the storage element 104 is simulated in the past state of the circuit "j."

In step S43, steps S44 to S54, which will be described later, are executed for each of faults occurred in the forward circuit area.

The observation time "j" of the past in relation to the observation time "i" is sequentially selected from 1 to i−1 (step S44). The circuit status "j" corresponding to the observation time "j" is acquired from the circuit status storage section 7 (step S45). In the circuit status "j," a fault of interest occurred in the forward circuit area up to the storage element is simulated (step S46).

In step S47, steps S48 to S50 are executed with regard to each of the storage elements to which fault events are propagated. More specifically, it is determined whether or not the propagation of a write clock signal is stored for the storage element of interest at the observation time "j" (step S48). If this is not the case (NO), steps S49 and S50 are bypassed. In contrast, if this is the case (YES), the fault writing section 13 writes the value of a fault into the storage element of interest by supplying a write clock signal to the same (step S49). The value of a fault to be written into the storage element is written into the fault memory section 12 simultaneously with the supply of the write clock signal (step S50).

It is determined whether or not j=i−1 (or whether or not the observation time "j" has become i−1) (step S51). If j≦i−1 (NO), steps S44 to S51 are repeated, taking j+1 as a new circuit status in place of j.

In contrast, if j=i−1 (YES in step S51), the current circuit status "i" is set (step S52). With regard to the storage element for which the value of a fault is written into the fault memory section 12, the fault reading section 14 evaluates whether or not the value of a fault written into the fault memory section 12 can be read on the basis of the status value of the input pins of the storage element in the current circuit status "i." If the value of a fault can be read, the fault reading section 14 reads the value of a fault from the fault memory section 12 and propagates the thus-read value to the output pins of the storage element (step S53). Fault simulation is performed from the output pins of the storage element through use of the value of a fault read from the fault memory section 12 (step S54).

After step S54 has been completed, the current circuit status "i" is stored in the circuit status storage section 7 (step S55 corresponding to step S16 shown in FIG. 2). The thus-stored circuit status "i" becomes the circuit status of the past with regard to the k-th (k>i) parallel test pattern which will be input later.

Steps S41 to S55 mentioned previously are repeatedly executed until "i" becomes equal to "n" and processing for the n-th test pattern set is completed, or until YES is selected in step S56 (corresponding to step S17 shown in FIG. 2).

Steps S43 to S54 will now be summarized. In a case where a fault is propagated to the storage element in the circuit status "j" through fault simulation, the fault writing section 13 refers to the write monitoring section 11. If a writing operation is recorded with regard to the storage element to which the fault is propagated in the circuit status "j," the fault is written into the fault memory section 12 by supplying a clock signal to the storage element.

With regard to the storage element for which the fault is written into the fault memory section 12, the fault reading section 14 evaluates whether or not the fault written into the fault memory section 12 can be read on the basis of the status values of the input pins of the storage element in the current circuit status "i." If the fault value is readable, the fault written in the fault memory section 12 is propagated to the output pins of the storage element, and the following fault simulation is executed in the current circuit status "i."

With reference to FIGS. 15 through 18, specific procedures of a fault passage method according to the present embodiment will be described.

FIG. 15(a) is a circuit diagram showing a storage element to which the fault passage method according to the present embodiment is applied. FIG. 15(b) is a timing chart showing the operation of the storage element at the time of true-value simulation. FIG. 15(b) shows the operation of RAM shown in FIG. 15(a) in the true-value simulation when data are written into the RAM during the period of a first pattern, and the thus-written data are read during the period of a second pattern.

In FIGS. 15(a) and 15(b), CK designates a clock signal, WE a write enable, A1 and A2 are 2 bits of addresses, Di a data input, and Do a data output. In FIG. 15(b), #1, #2, #3 written in the output data Do represent outputs from RAM at respective instants. #1 indicates a value read from the addresses (A1, A2) set during the period of the first pattern. #2 indicates the value of data written in the storage element during the period of the first pattern. #3 indicates a value read from the addresses (A1, A2) set during the period of the second pattern.

FIG. 16(a) shows an operation truth table of the RAM shown in FIG. 15(a), while FIG. 16(b) shows the contents of the RAM, for the cased where the RAM performs writing operation during the period of the first pattern after initialization, and performs reading operation during the period of the second pattern. In FIGS. 16(a) and 16(b), reference symbol "N" is a negative clock signal, "X" is an indefinite value, and "*" is "Don't Care."

Figure 17A:
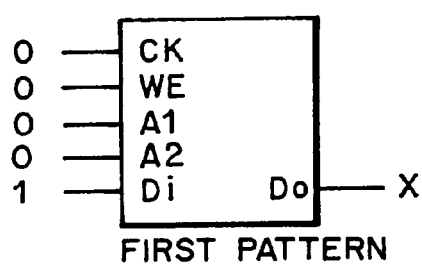
FIGS. 17(a) and 17(b) are diagrammatic representations showing the state of pins for the first pattern and the second pattern when the storage element shown in FIG. 15(a) is subjected to true-value simulation.
Figure 17B:
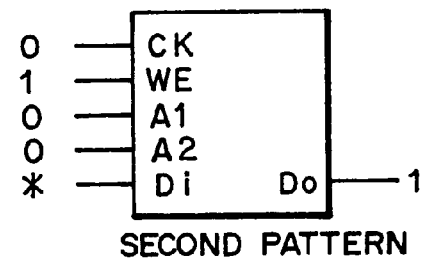

FIG. 17(a) shows the state of each of pins of the RAM shown in FIG. 15(a) during the period of the first pattern, while FIG. 17(b) shows the state of each of the pins of the RAM during the period of the second pattern, when true-value simulation is performed for the RAM on the basis of the operation truth table shown in FIG. 16(a).

For a case where a 0-stuck-at fault is assumed to arise in the data input pin Di of the RAM, a specific explanation will be given of the passage of the fault from the first pattern to the second pattern as a result of foregoing operations according to the present embodiment, referring to FIGS. 18(a) to 18(e).

As shown in FIG. 18(a), in the true-value simulation performed on the basis of the first pattern, the write monitoring section 11 monitors a clock pin CK and stores whether or not the clock signal is propagated to the clock pin. In this example, the propagation of the clock signal is stored during the period of the first pattern. The circuit status [the state of the pins of the RAM shown in FIG. 18(a)] during the period of the first pattern at the instant when the true-value simulation is observed, is stored in the circuit status storage section 7.

As shown in FIG. 18(b), the 0-stuck-at fault of the data input pin Di is injected in and propagated to the RAM in the circuit status at the observation time of the first pattern stored in the circuit status storage section 7 by operation of the parallel pattern fault simulation section 6. As shown in FIG. 18(c), since the propagation of the fault is stored by the write monitoring section 11 with regard to the RAM to which the fault is propagated, the fault writing section 13 inputs a signal to the RAM in order to induce a writing operation.

Since the RAM performs a writing operation at the trailing edge (i.e., during the period of a change from 0 to 1) of the clock signal, a signal "1" is supplied to the clock pin CK as a signal for inducing a writing operation. In response to the change in the signal; i.e., CK=0→1 caused by the fault writing section 13, the fault memory section 12 stores the value of a fault such as that shown in FIG. 18(d).

As shown in FIG. 18(e), the fault reading section 14 reads the contents of the fault memory section 12 in response to the state of the input pins at the current observation time. For example, 0 is read as the value of a fault from an address (0, 0) of the fault memory section 12 in response to A1=0, A2=0.

The fault value of 0 thus read by the fault reading section 14 is inherited, whereby the fault is propagated to the circuit status at the instant when simulation based on the second pattern is observed.

Through processing mentioned previously, the 0-stuck-at fault assumed to arise in the data input pin Di is passed from the pattern 1 to the pattern 2.

As described above, under the fault passage method according to the present embodiment, a fault in the forward circuit area is subjected to fault simulation in the past circuit state "j" at the outset. In a case where the write monitoring section 11 records a writing operation in the circuit status "j" with regard to the storage element to which the fault is propagated, the fault writing section 13 supplies a write clock signal to the storage element, so that the fault is written into the fault memory section 12. Finally, the fault reading section 14 reads the fault from the fault memory section 12, and fault simulation is performed from the output pins of the storage element in the current circuit status "i." Accordingly, the fault is allowed to pass through the storage element while the sequential operation of the storage element are maintained.

In this way, the fault can be passed from an observation time of the past to an observation time of the present. Namely, the fault can passed through the storage element 104 from the input pins 104a to the output pins 104b. A fault in a route which is activated by transient pulse outputs such as pulses generated through chopping operation can be detected, thereby resulting in a great contribution to improvements in a diagnostic rate.

[5] Description of Test Pattern Generation Method

Next, an explanation will be given of a method of generating a test pattern according to the present embodiment which is a part of a test pattern generating operation performed by the test pattern generation section 2.

Under conventional method (1) in which a plurality of (e.g., "m") test patterns are processed in parallel, test patterns are accumulated until at least more than "m" test patterns—which permit parallel simulations—are generated, and no simulation is performed. During the period of accumulation of test patterns, fault detection is not performed.

For this reason, there is a chance that after having selected a certain undetected fault and generated a test pattern for the purpose of detecting the fault, the test pattern generation section 2 will select another undetected fault in an activation path to be detected by means of the thus-generated test pattern, so that a redundant test pattern is eventually generated, thereby resulting in a risk of an increase in the number of test patterns.

To prevent such a problem, according to the present embodiment, when a test pattern used for the purpose of detecting a certain undetected fault is generated by the test pattern generation section 2, another undetected fault—which can be reliably detected by means of the thus-generated test pattern and exists in the activation path—is handled as a detected fault, thereby rejecting a choice of that undetected fault. Accordingly, the preparation of a redundant test pattern is prevented.

With reference to a flowchart (steps S61 to S65) shown in FIG. 5, the test pattern generation method according to the embodiment will be described. FIG. 5 shows the correspondence between the procedures (i.e., steps and processing) of the test pattern generation method in the present embodiment and constituent sections which actually execute the procedures.

As shown in FIG. 5, the circuit branch point detection section 15 marks and detects, as circuit branch points, output pins of gates (e.g., a macro element) having a plurality of fanouts or an input pin of a gate (e.g., a macro element) having a plurality of output terminals (step S61).

The test pattern generation section 2 generates a test pattern used for the purpose of detecting a selected fault (step S62). If the test pattern generation section 2 has succeeded in generating the test pattern (YES in step S63), the circuit branch point search section 16 searches a circuit branch point on the output side with respect to a network—in which the thus-selected fault is assumed to arise—from the circuit branch points marked by the circuit branch point detection section 15 (step S64).

In the circuit status set by the test pattern generation section 2 for the purpose of generating a test pattern, from a route between the circuit branch point searched by the circuit branch point search section 16 and at least one circuit branch point in a stage prior to the circuit branch point, the activation path search section 17 searches an activation path which permits detection of another fault when being activated. The circuit information hold section 19 sets an undetected fault in the activation path to a detected fault (step S65).

Figure 19A:
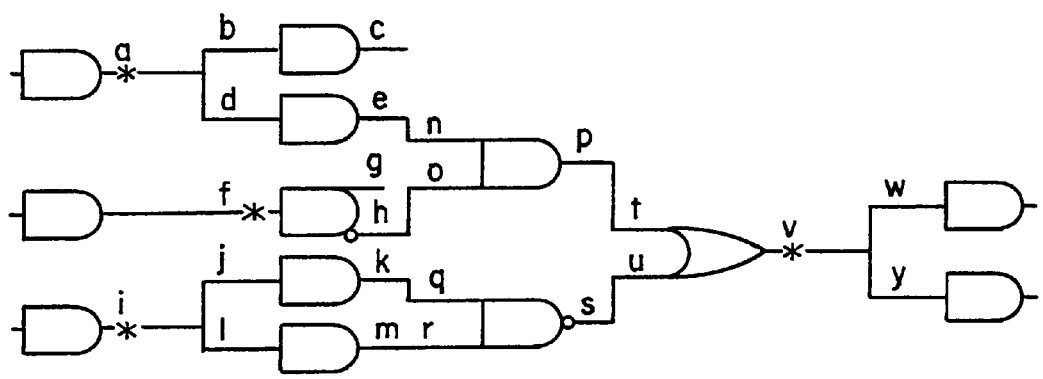
FIGS. 19(a) to 19(c) are block diagrams for explaining specific procedures of the test pattern generation method according to the present embodiment.
Figure 19B:
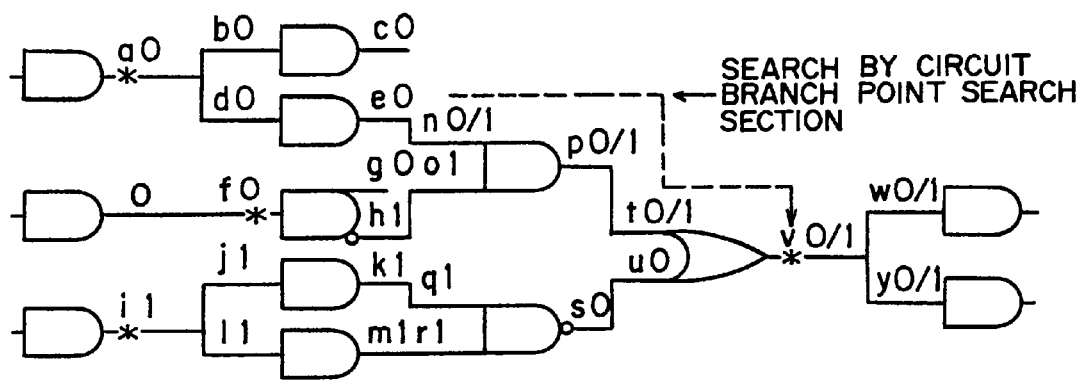
Figure 19C:
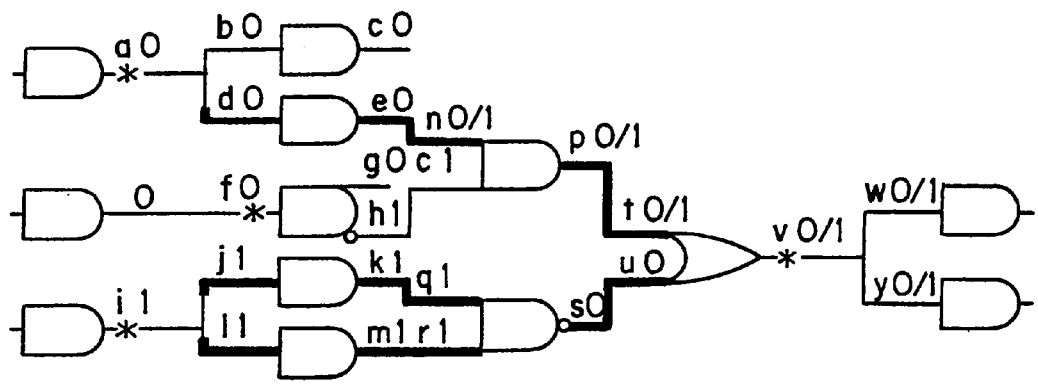
Figure 20:
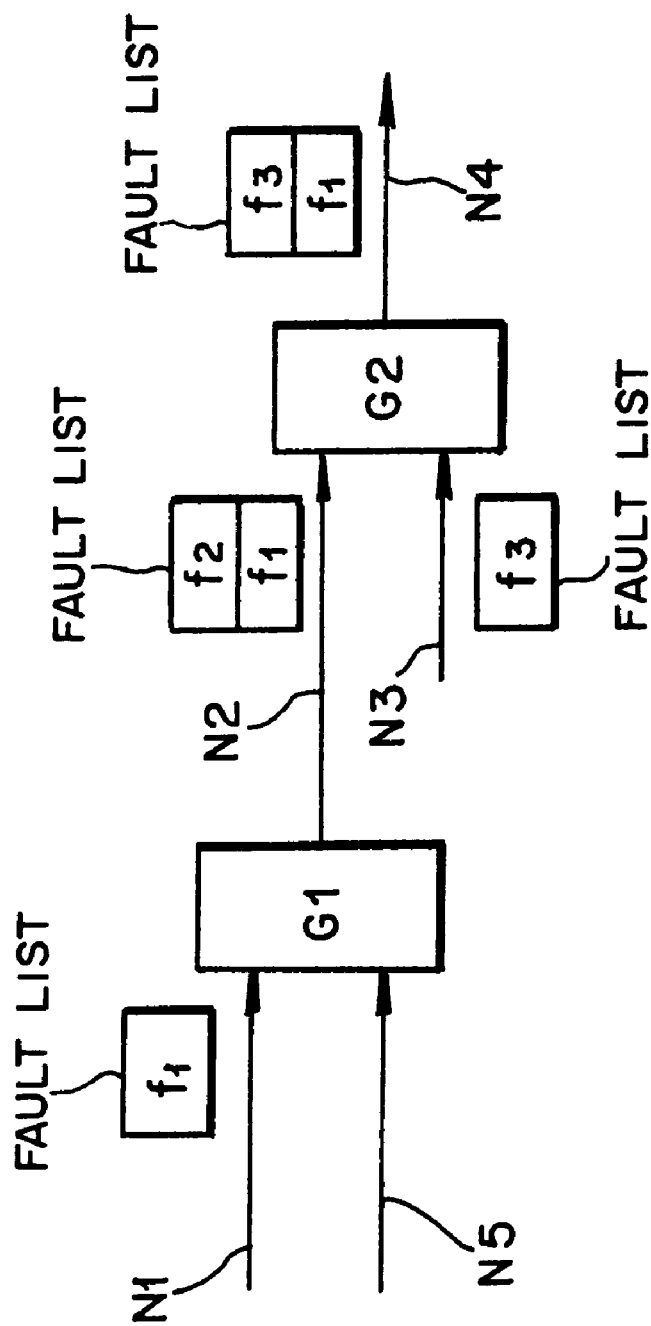
FIG. 20 is a block diagram for explaining a conventional method.

With reference to FIGS. 19(a) to 19(c), specific procedures of the test pattern generation method according to the embodiment will be described.

In an example of circuitry shown in FIGS. 19(a) to 19(c), networks are assigned reference symbols "a" to "y," respectively. A network corresponding to a circuit branch point detected by the circuit branch point detection section 15 is assigned reference symbol "*."

In the case of the circuit shown in FIG. 19(a), the circuit branch point detection section 15 detects output pin networks {a, i, v} of gates each having a plurality of fanouts and an input pin network {f} of a gate having a plurality of outputs as circuit branch points.

FIG. 19(b) shows one example of a circuit status which is set in the test pattern generation section 2 for the purpose of generating a test pattern when the test pattern generation section 2 succeeds in generating a test pattern by selection of a 1-stuck-at fault assumed to arise in the network "n." As shown in FIG. 19(b), the circuit branch point search section 16 searches a circuit branch point in the direction of output in relation to the network "n," and the circuit branch point detection section 15 detects the marked network "v." A symbol "0/1" shown in FIGS. 19(b) and 19(c) represents a true value/the value of a fault.

A route indicated by a thick line shown in FIG. 19(c) is an activation path in the circuit status set by the test pattern generation section 2. From a route between the network "v" and at least one circuit branch point (the network "d," "j," or "1") in a stage prior to the network "v," the activation path search section 17 searches an activation path which becomes able to detect another fault when being activated. The value of a fault which is reverse to a true value is set to a detected fault.

Provided that all stuck-at faults are assumed to arise in networks in the example shown in FIG. 19(c), faults {v1, t1, p1, n1, e1, d1} in an activation path "v-t-p-n-e-d" are handled as detected faults. Faults {(v1), u1, s1, q0, k0, j0} in an activation path "v-u-s-q-k-j" are handled as detected faults. Further, faults {(v1), (u1), (s1), r0, m0, l0} in an activation path "v-u-s-r-m-l" are handled as detected faults. For example, fault "v1" designates a 1-stuck-at fault supposed to arise in the network "v." Here, a parenthesized fault represents a duplicated fault which is excluded from the faults to be detected.

As described above, under the test pattern generation method according to the present embodiment, in a case where the test pattern generation section 2 succeeds in generating a test pattern corresponding to the selected fault, faults in the activation paths which are reliably detected; namely, an undetected fault assumed to arise in an output-side activation path between the network—in which the selected fault is assumed to arise—and the circuit branch point, and an undetected fault assumed to arise in an input-side activation path with respect to the network—in which the selected fault is assumed to arise—are set to detected faults when the selected fault is detected by the fault simulation.

Accordingly, the test pattern generation section 2 can avoid re-selection of undetected faults in the activation path which can be detected by means of the test pattern previously prepared at the time of accumulation of the test patterns. The preparation of a redundant test pattern can be avoided, thereby resulting in a great contribution to increasing the speed of fault simulation.

[6] Description of Increasing the Speed of True-value Simulation

Next, an explanation will be given of a method of increasing the speed of true-value simulation according to the present embodiment which is implemented by the event propagation flag setting section 18 and the parallel pattern true-value simulation section 5.

As shown in FIG. 8, in a case where a scan flip-flop 103 is formed from a master-slave latch configuration, in synchronization with a turn-on of a clock signal, the master latch 103a becomes a through state, and the slave latch 103b becomes a hold state. At this time, the master latch 103a captures data.

Subsequently, in synchronization with a turn-off of the clock signal, the master latch 103a becomes a hold state, and the slave latch 103b becomes a through state. If a scan-in value is different from the captured value, the captured value is taken as an event. This event is propagated to the internal circuit from the slave latch 103b.

When a scan-in value input by a subsequent test pattern is different from the captured value, the scan-in value is taken as an event, which is propagated to the internal circuit from the slave latch 103b.

However, in a case where a forward traceable area extending from the slave latch 103b to the primary-output-side scan flip flop 103 is formed solely from a combinational circuit, the circuit status—which is set by the captured value propagated from the slave latch 103b—is replaced with a circuit status—which is set by the scan-in value of the next input test pattern-by means of a clock-off simulation in the combinational circuit area. As a result, the true-value simulation in the circuit status set by the previous captured value becomes redundant in the combinational circuit area.

In a case where the forward traceable area extending from the slave latch 103b to the primary-output-side scan flip-flop 103 includes the storage element 104, the true-value simulation in the circuit status set by the captured value becomes necessary because of the presence of the storage element 104 whose internal status is changed by means of the captured value propagated from the slave latch 103b.

The redundant processing produced in the area that comprises solely the combinational circuit does not arise in a case where there is a match between the value captured by the scan flip-flop 103 through use of a certain test pattern and the next scan-in value. Particularly, there is very little likelihood that redundant processing is prevented by a match between the values over all bits of a parallel test pattern. Therefore, the speed of the true-value simulation is reduced.

In the present embodiment, the forward traceable area extended from the slave latch 103b can be recognized by the circuit isolation section 1 in such a way that the forward circuit area includes the storage element 104, and the backward circuit area comprises solely a combinational circuit. Accordingly, an event is propagated solely from the slave latch 103b belonging to the forward circuit area during the clock-off simulation, and the slave latch 103b belonging to the backward circuit area is prevented from propagating an event. As a result, a redundant simulation is prevented, to thereby speed up true-value simulation.

With reference to a flow chart (steps S71 to S77) shown in FIGS. 6(a) and 6(b), the method of increasing the speed of true-value simulation according to the present embodiment will be described.

First, as shown in FIG. 6(a), at initialization (step S1 shown in FIG. 2), the circuit isolation section 1 divides the inside of the integrated circuit into a circuit area forward of the storage element 104 and a circuit area backward of the same (step S71). The propagation flag setting section 18 sets an event propagation flag for the slave latch 103b belonging to the forward circuit area, but does not set an event propagation flag for the slave latch 103b belonging to the backward circuit area (step S72). The event propagation flags are set in the circuit information holding section 19 according to forward/backward circuit area instruction flags received from the circuit isolation section 1.

As shown in FIG. 6(b), with regard to the true-value simulation performed by the parallel pattern true-value simulation section 5, it is determined whether or not the simulation is a clock-off simulation (step S73). If this is the case (YES), it is determined whether or not an evaluation gate is the slave latch 103b (step S74). If the gate is the slave latch 103b (YES), it is determined whether or not an event propagation flag is set for the slave latch 103b (step S75).

If the event propagation flag is not set (NO in step S75), an event based on the value captured by the master latch 103a in a clock-on state is prevented from being further propagated from the output pin of the slave latch 103b (step S76).

In contrast, if NO is selected in steps S73 and S74, or if the event propagation flag is set (YES in step S75), true-value simulation is executed (step S77).

As mentioned previously, under the method of increasing the speed of true-value simulation according to the present embodiment, if the scan flip-flop 103 is formed from a master-slave latch configuration, the circuit status is replaced by simulation based on a scan-in value input for the next test pattern. Therefore, in the backward circuit area where simulation of setting a circuit status by means of a captured value passing through the slave latch 103b becomes redundant, a redundant simulation based on a captured value is prevented. In contrast, simulation based on a captured value is performed solely in the forward circuit area. Accordingly, the amount of event is reduced, thereby considerably increasing the speed of true-value simulation.

[7] More Specific Description of the Fault Simulation Method/Apparatus

Figure 7:
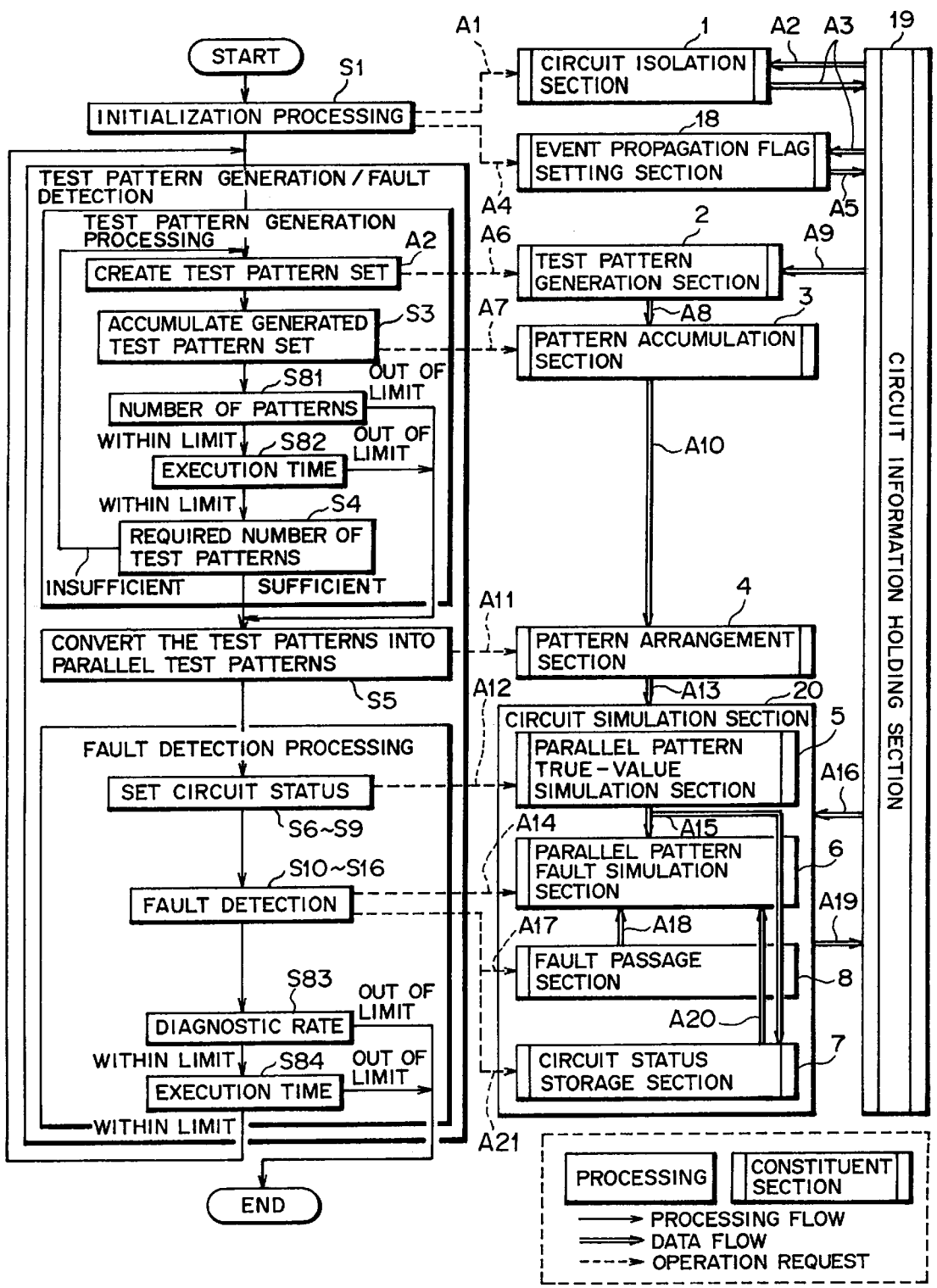
FIG. 7 is a flowchart for more specifically explaining the procedures of the fault simulation method according to the present embodiment with reference to correspondence between the procedures and constituent sections which actually execute the procedures.

Finally, turning to FIG. 7, the procedures of the fault simulation method according to the present embodiment will be described more specifically with reference to the correspondence between the procedures and the constituent sections that actually perform the procedures. In FIG. 7, the reference numerals which are the same as those used in the previous description indicate elements or (constituent sections) which are the same as or substantially the same as those described previously. Therefore, their explanations will be omitted here. Further, step numbers which are the same as those used in the previous description indicate procedures which are the same as or substantially the same as those described previously. Therefore, their explanations will be omitted here.

In an example shown in FIG. 7, determination processing performed in steps S81 to S84 are newly added to the processing described in the flowchart shown in FIG. 2. The generation of a test pattern and the processing of a circuit simulation are completed by: restricting the number of patterns to be generated (step S81); restricting execution time (steps S82 and S84); and restricting a diagnostic value as a result of a diagnostic rate reaching a given value (step S83). In a case where unsimulated test patterns are accumulated in the test pattern accumulation section 3, at the time of completion of the processing, a circuit simulation is finally and forcefully executed through use of remaining test patterns even when the number of test patterns required to perform simulation are not yet accumulated.

In FIG. 7, arrows A1, A4, A6, A7, A11, A12, A14, A17, and A21 designate operation requests provided for the respective constituent sections. A1 designates a circuit isolation request; A4 a flag setting request; A6 a test pattern generation request; A7 a test pattern accumulation request; A11 a request for converting a parallel test pattern; A12 a request for setting a current circuit status; A14 a request for detecting a fault in a forward/backward circuit area; A17 a request for permitting passage of a fault from the forward circuit area; and A21 a request for storing the current circuit status.

Arrows A2, A3, A9, A10, A13, A15, A16, A18, A19, and A20 designate the flow of data between the constituent sections. A2 designates the flow of data related to the relation of connection between networks and to a gate logic function; A3 the flow of forward/backward circuit area instruction flags; A9 the flow of data related to the relation of connection between networks, to a gate logic function, and to a fault detection flag; A10 the flow of aggregations of a test pattern set, test pattern length, and the number of test pattern sets; A13 the flow of m-parallel×n-serial test patterns; A15 the flow of data related to the current circuit status; A16 the flow of data related to the relation of connection between networks, a gate logic function, and a fault detection flag; A18 the flow of data related to the passage of a fault; A19 the flow of fault detection flags; and A20 the flow of data related to a past circuit status.

The present invention is not limited to the foregoing embodiments and can be practiced while being subjected to various modifications within the scope of the invention.

What is claimed is:

1. A fault simulation method for detecting a fault in an integrated circuit, which is adapted to assume one of a plurality of circuit states, using a plurality of test patterns, said method comprising the steps of:

logically dividing the integrated circuit, which is an object of fault simulation, into a forward circuit area, which is a combinational circuit area on an input-pin side of a storage element included in said integrated circuit, and a backward circuit area, which is a combinational circuit except said forward circuit area;

performing forward fault simulation for detecting a fault in said forward circuit area apart from backward fault simulation for detecting a fault in said backward circuit area; and if a fault, which propagates to input pins of said storage element exists in said forward circuit area when the forward fault simulation is executed, writing the value of the fault at that observation time into said storage element, and at a later observation time, reading the value of the fault from said storage element and propagating the read value to a combinational circuit being connected to output pins of said storage element.

2. The fault simulation method according to claim 1, further comprising:

generating and accumulating a plurality of test pattern sets for detecting a fault in the integrated circuit;

sorting the thus-stored plurality of test pattern sets in descending order according to the length of each test pattern set;

scheduling the thus-sorted plurality of test pattern sets and rearranging the scheduled test pattern sets into a parallel test pattern, which is a group of a plurality of test patterns, with maintaining the sequentiality of each test pattern set; and using the parallel test pattern as the test patterns.

3. The fault simulation method according to claim 1, further comprising:

monitoring writing of data into said storage element at the time of a true-value simulation;

storing the value of the fault which is propagated from said forward circuit area to said storage element at a certain observation time if the writing of data into said storage element has been detected; and reading the value of the fault at a later observation time and propagating the read value to said combinational circuit wherein said combination circuit is connected to output the pins of said storage element.

4. The fault simulation method according to claim 1, further comprising:

previously detecting circuit branch points in said integrated circuit;

searching from the previously-detected circuit branch points a first circuit branch point on the output side with respect to a network where the fault is assumed to arise if a test pattern used for detecting a certain fault is generated; and searching an activation path to be activated at the time of detection of a fault in a route between the thus searched circuit branch point and at least one circuit branch point upstream of the searched circuit branch point, and regarding an undetected fault existing in the activation path as a detected fault.

5. The fault simulation method according to claim 1, further comprising:

stopping propagation of events from a slave latch located in the backward circuit area in a clock-off simulation associated with true-value simulation which is performed to detect a fault in advance, while an event is propagated only from the slave latch located in the forward circuit area, if a scan flip-flop of the integrated circuit has a master-slave latch configuration.

6. A fault simulation apparatus for detecting a fault in an integrated circuit, which is adapted to assume one of a plurality of circuit states, using a plurality of test patterns, said apparatus comprising:

a circuit dividing section for logically dividing said integrated circuit, which is an object of fault simulation into a forward circuit area, which is a combinational circuit area on an input-pin side of a storage element included in said integrated circuit, and a backward circuit area, which is a combinational circuit except said forward circuit area;

a test pattern generation section for generating test pattern sets one at a time;

a pattern accumulation section for accumulating the series test pattern sets generated by said test pattern generation section;

a pattern arrangement section for arranging said series test pattern sets, which are stored in said pattern accumulation section, in parallel;

a parallel pattern true-value simulation section to perform true-value simulation in a true state, where there is not any fault, by inputting said parallel test pattern, which is a group of a plurality of test patterns, into said integrated circuit;

a parallel pattern fault simulation section to perform forward fault simulation for detecting a fault in said forward circuit area by inputting and propagating a fault into said forward circuit area after stabilization of the true-value simulation, and to check whether the fault is propagated through said integrated circuit on the basis of a difference between a result of the true value simulation and a result of the fault simulation; and a fault passage section for, if a fault which is propagated to the input pins of said storage element during the course of simulation by the parallel pattern fault simulation section is in said forward circuit area, to write the value of the fault into the storage element at the observation time of the fault, and at a later observation time, to read the value of the fault from said storage element and to propagate the value of the fault to a combinational circuit area connected to output pins of said storage element.

7. The fault simulation apparatus according to claim 6, wherein said pattern arrangement section comprises:

a pattern sorting section to sort the plurality of test pattern sets stored in the pattern accumulation section in descending order according to the length of each test pattern set; and a pattern scheduling section to schedule the plurality of test pattern sets sorted by said pattern sorting section and to rearrange the plurality of test pattern sets into a parallel test pattern while maintaining the sequentiality of each test pattern set.

8. The fault simulation apparatus according to claim 6, further comprising:

a writing operation monitoring section to monitor the writing of data into said storage element while said parallel pattern true-value simulation section is performing simulation;

a fault value memory section to store the value of a fault to be written into said storage element;

a fault value writing section to write the fault value, which is propagated from said forward circuit area to said storage element at a certain observation time, into said fault value memory section, if the writing operation monitoring section has detected the writing of data into said storage element during the true-value simulation; and a fault value reading section, which at a later observation time, to read the fault value from said fault value memory section and to propagate the thus-read fault value to said combinational circuit connected to the output pins of said storage element.

9. The fault simulation apparatus according to claim 6, further comprising:
a circuit branch point detection section to detect circuit branch points in said integrated circuit in advance;
a circuit branch point search section to search a first circuit branch point from the circuit branch points detected by said circuit branch point detection section if a test pattern used for detecting a certain fault is generated, the first circuit branch point being on the output side with respect to a network where the fault is assumed to arise; and
an activation circuit search section to search, from a route between the circuit branch point searched by said circuit branch point search section and at least one circuit branch point upstream of the searched circuit branch point, an activation path to be activated at the time of detection of the fault, and to set an undetected fault existing in the activation path as a detected fault.

10. The fault simulation apparatus according to claim 6, wherein
a scan flip-flop of the integrated circuit has a master-slave latch configuration, if said apparatus has a flag setting section for setting a flag with regard to the slave latch which is separated by said circuit isolation section so as to belong to said forward circuit area; and
in clock-off simulation, said parallel pattern true-value simulation section refers to said flag set by said flag setting section to thereby suspend propagation of an event from the slave latch belonging to said backward circuit area, as well as to propagate an event only from the slave latch belonging to said forward circuit area.

11. The fault simulation apparatus according to claim 6, wherein the parallel pattern fault simulation section performs forward fault simulation for detecting the fault in said forward circuit area apart from backward fault simulation for detecting a fault in said backward circuit area.

12. A storage medium to store a fault simulation program for automatically detecting a fault in an integrated circuit by a computer and through use of a test pattern, and to cause the computer to operate as:
circuit dividing means for logically dividing the integrated circuit, which is an object of fault simulation, into a forward circuit area, which is a combinational circuit area on an input-pin side of a storage element included in said integrated circuit, and a backward circuit area, which is a combinational circuit except said forward area;
test pattern generation means for generating test pattern sets one at a time;
pattern arrangement means for arranging said series test pattern sets generated by said test pattern generation means in parallel;
parallel pattern true-value simulation means for performing true-value simulation in a true state, where there is not any fault, by inputting said parallel test pattern, which is a group of a plurality of test patterns, into the integrated circuit;
parallel pattern fault simulation means for performing forward fault simulation for detecting fault in said forward circuit area by inputting and propagating a fault into said forward circuit area after stabilization of said true-value simulation, and for checking whether the fault is propagated through said integrated circuit on the basis of a difference between a result of said true-value simulation and a result of said fault simulation; and fault passage means for, when a fault which is propagated to the input pins of the storage element during the course of simulation for said forward circuit area apart from said backward circuit area, by said parallel pattern fault simulation means, is in said forward circuit area, writing the value of the fault at the observation time of the fault into the storage element, and at later observation time, reading the value of the fault from the storage element and propagating the value of the fault to a combinational circuit connected to output pins of the storage element.

13. The storage medium to store a fault simulation program according to claim 12, wherein the fault simulation program causes the computer to operate as:
pattern sorting means for sorting the plurality of test pattern sets in descending order according to the length of each test pattern set; and
pattern scheduling means for scheduling the plurality of test pattern sets sorted by the pattern sorting means and for rearranging the plurality of test pattern sets into a parallel test pattern while maintaining the sequentiality of each test pattern set, whereby the computer operates as the pattern arrangement means.

14. The storage medium to store a fault simulation program according to claim 12, wherein the fault simulation program causes the computer to operate as:
writing operation monitoring means for monitoring the writing of data into the storage element while the parallel pattern true-value simulation means is performing simulation;
fault value writing means for writing the fault value, which is propagated from the forward circuit area to the storage element at a certain observation time, into a fault value memory section, if the writing operation monitoring means has detected the writing of data into said storage element during the true-value simulation; and
fault value reading means, which at a later observation time, reads the fault value from the fault value memory section and propagates the thus-read fault value to said combinational circuit connected to the output pins of said storage element.

15. The storage medium to store a fault simulation program according to claim 12, wherein said fault simulation program causes the computer to operate as:
circuit branch point detection means for detecting circuit branch points in the integrated circuit in advance;
circuit branch point search means for, if a test pattern used for detecting a certain fault is generated, searching a first circuit branch point from the circuit branch points detected by said circuit branch point detection means, the first circuit branch point being on the output side with respect to a network where the fault is assumed to arise; and
activation circuit search means for searching, from a route between the circuit branch point searched by the circuit branch point search means and at least one circuit branch point upstream of the searched circuit branch point, an activation path to be activated at the time of detection of a fault, and for setting an undetected fault existing in the activation path as a detected fault.

16. The storage medium to store a fault simulation program according to claim 12, wherein if a scan flip-flop of the integrated circuit has a master-slave latch configuration, the fault simulation program causes the computer to operate as flag setting means for setting a flag with regard to the slave latch which is separated by the circuit isolation means so as to belong to the forward circuit area, and in clock-off simulation, said parallel pattern true-value simulation means is activated in such a way as to refer to the flag set by the flag setting means, to thereby suspend propagation of an event from the slave latch belonging to the backward circuit area, as well as to propagate an event only from the slave latch belonging to the forward circuit area.

17. A fault simulation method for detecting a fault in an integrated circuit, which is adapted to assume one of a plurality of circuit states, using a plurality of test patterns, said method comprising the steps of:

logically dividing an integrated circuit, which is an object of fault simulation, into a forward circuit area, which is a combinational circuit area on an input-pin side of a storage element included in said integrated circuit, and a backward circuit area, which is a combinational circuit except said forward circuit area;

performing backward fault simulation for detecting a fault in said backward circuit area of the integrated circuit in a first circuit state using one of the test patterns;

performing forward fault simulation for a forward circuit area of said integrated circuit; and writing a value of the fault at that observation time into said storage element, and at a later observation time, reading said value of the fault from the storage element and propagating the value of the fault to a combinational circuit connected to output pins of said storage element, if a fault which propagates to input pins of said storage element exists in said forward circuit area during said forward fault simulation.

18. The fault simulation method according to claim 17 wherein the step of performing forward fault simulation for said forward circuit area is performed apart from backward fault simulation for detecting the fault in said backward circuit area.

19. A fault simulation apparatus for detecting a fault in an integrated circuit, comprising:

a circuit dividing section for logically dividing the integrated circuit, which is an object of fault simulation, into a forward circuit area, which is a combinational circuit area on an input-pin side of a storage element included in said integrated circuit, and a backward circuit area, which is a combinational circuit except said forward circuit area;

a parallel pattern fault simulation section to perform fault simulation for detecting a fault in said forward circuit area using parallel test pattern, which is a group of a plurality of test patterns; and a write monitoring section to detect a propagated fault resulting from transient pulse output of said integrated circuit by storing the propagated fault with a corresponding clock signal in said storage element.

20. The fault simulation apparatus according to claim 19, wherein the parallel pattern fault simulation section performs fault simulation for detecting the fault in said forward circuit area apart from performing fault simulation for detecting a fault in said backward circuit area.

* * * * *

UNITED STATES PATENT AND TRADEMARK OFFICE
CERTIFICATE OF CORRECTION

PATENT NO. : 6,205,567 B1
DATED : March 20, 2001
INVENTOR(S) : Daisuke Maruyama

It is certified that error appears in the above-identified patent and that said Letters Patent is hereby corrected as shown below:

<u>Column 27,</u>
Line 18, begin a new paragraph with "Using".
Line 31, change "output the" to -- the output --.

Signed and Sealed this

Sixteenth Day of October, 2001

Attest:

*Nicholas P. Godici*

NICHOLAS P. GODICI
*Acting Director of the United States Patent and Trademark Office*

*Attesting Officer*